United States Patent
Ma et al.

(10) Patent No.: US 11,934,472 B1
(45) Date of Patent: Mar. 19, 2024

(54) SYSTEM AND METHOD FOR FEATURE DETERMINATION AND CONTENT SELECTION

(71) Applicant: Yahoo Assets LLC, Dulles, VA (US)

(72) Inventors: Yufeng Ma, Santa Clara, CA (US); Rao Shen, Sunnyvale, CA (US); Kostas Tsioutsiouliklis, Saratoga, CA (US); Donghyun Kim, San Jose, CA (US); Liuqing Li, Santa Clara, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 17/973,576

(22) Filed: Oct. 26, 2022

(51) Int. Cl.
*G06F 7/00* (2006.01)
*G06F 16/00* (2019.01)
*G06F 16/9535* (2019.01)
*G06F 16/9538* (2019.01)
*G06N 3/08* (2023.01)

(52) U.S. Cl.
CPC ...... *G06F 16/9535* (2019.01); *G06F 16/9538* (2019.01); *G06N 3/08* (2013.01)

(58) Field of Classification Search
None
See application file for complete search history.

(56) References Cited

U.S. PATENT DOCUMENTS

| 2013/0086082 | A1* | 4/2013 | Park | G06F 16/9535 707/748 |
| 2020/0372016 | A1* | 11/2020 | Rogynskyy | H04L 67/1095 |

* cited by examiner

*Primary Examiner* — Tuan A Pham
(74) *Attorney, Agent, or Firm* — Cooper Legal Group LLC

(57) ABSTRACT

In an example, first entities are extracted from user profiles. Second entities are extracted from content information associated with content item. User-associated metrics associated with the first entities are determined based upon the user profiles and/or content events. First vector representations of the first entities and second vector representations of the second entities are processed to generate an attention distribution array. Each value of the attention distribution array represents, for a user interested in an entity of the first entities, a proportion of (i) entity-specific activity, of the user, related to an entity of the second entities relative to (ii) an entirety of activity of the user. An inferred activity distribution array is generated by applying the user-associated metrics to the attention distribution array. A filtered subset of activity distribution values is generated by pruning values from the inferred activity distribution array. Transmission of content is controlled using the filtered subset of activity distribution values.

20 Claims, 19 Drawing Sheets

SYSTEM AND METHOD FOR FEATURE DETERMINATION AND CONTENT SELECTION

BACKGROUND

Many services, such as websites, applications, etc. may provide platforms for viewing media. For example, a user may interact with a service. While interacting with the service, selected media may be presented to the user automatically. The media may include advertisements advertising products and/or services associated with a company, news articles about current events, etc.

SUMMARY

In accordance with the present disclosure, one or more computing devices and/or methods are provided. In an example, user activity of a plurality of users across a plurality of internet resources is monitored. A first plurality of content events is identified in the user activity. A plurality of user profiles associated with the plurality of users are generated based upon the first plurality of content events. Each user profile is indicative of an entity in which a user, of the plurality of users, has an interest. First entities are extracted from the plurality of user profiles. Supplemental information is retrieved from one or more first remote devices for each of the first entities. First vector representations of the first entities are generated using the supplemental information for each of the first entities. Each of the first vector representations is generated based upon supplemental information associated with a corresponding entity of the first entities. A second plurality of content events is evaluated to identify a plurality of content items. Second entities are extracted from content information associated with the plurality of content items. Supplemental information is retrieved from one or more second remote devices for each of the second entities. Second vector representations of the second entities are generated using the supplemental information for each of the second entities. Each of the second vector representations is generated based upon supplemental information associated with a corresponding entity of the second entities. A plurality of user-associated metrics associated with the first entities are determined based upon the plurality of user profiles and/or the second plurality of content events. A first user-associated metric is representative of online activity of one or more first users having an interest in a first entity of the first entities. A second user-associated metric is representative of online activity of one or more second users having an interest in a second entity of the first entities. The first vector representations and the second vector representations are processed, using a neural network model, to generate an attention distribution array. Each value of the attention distribution array represents, for a user interested in an entity of the first entities, a proportion of (i) entity-specific activity, of the user, related to an entity of the second entities relative to (ii) an entirety of activity of the user. An inferred activity distribution array is generated by applying the plurality of user-associated metrics to the attention distribution array. A filtered subset of activity distribution values is generated by pruning values from the inferred activity distribution array. A profile-processing machine learning model is trained using the filtered subset of activity distribution values to generate a trained profile-processing machine learning model. Transmission of content is controlled using the trained profile-processing machine learning model.

In an example, first entities are extracted from a plurality of user profiles associated with a plurality of users. Each user profile is indicative of an entity in which a user, of the plurality of users, has an interest. First vector representations of the first entities are generated. A plurality of content events is evaluated to identify a plurality of content items. Second entities are extracted from content information associated with the plurality of content items. Second vector representations of the second entities are generated. A plurality of user-associated metrics associated with the first entities is determined based upon the plurality of user profiles and/or the plurality of content events. A first user-associated metric is representative of online activity of one or more first users having an interest in a first entity of the first entities. A second user-associated metric is representative of online activity of one or more second users having an interest in a second entity of the first entities. The first vector representations and the second vector representations are processed, using a model, to generate an attention distribution array. Each value of the attention distribution array represents, for a user interested in an entity of the first entities, a proportion of (i) entity-specific activity, of the user, related to an entity of the second entities relative to (ii) an entirety of activity of the user. An inferred activity distribution array is generated by applying the plurality of user-associated metrics to the attention distribution array. A filtered subset of activity distribution values is generated by pruning values from the inferred activity distribution array. A machine learning model is trained using the filtered subset of activity distribution values to generate a trained machine learning model. Transmission of content is controlled using the trained machine learning model.

In an example, first entities are extracted from a plurality of user profiles associated with a plurality of users. Each user profile is indicative of an entity in which a user, of the plurality of users, has an interest. First vector representations of the first entities are generated. A plurality of content events is evaluated to identify a plurality of content items. Second entities are extracted from content information associated with the plurality of content items. Second vector representations of the second entities are generated. A plurality of content-associated metrics associated with the second entities is determined based upon the plurality of content events. A first content-associated metric is representative of online activity performed in association with one or more first content items, of the plurality of content items, associated with a first entity of the second entities. A second content-associated metric is representative of online activity performed in association with one or more second content items, of the plurality of content items, associated with a second entity of the second entities. The first vector representations and the second vector representations are processed using a model to generate an attention distribution array. Each value of the attention distribution array represents, for a content item associated with an entity of the second entities, a proportion of (i) activity performed in association with the content item by one or more users having an interest in an entity of the first entities relative to (ii) an entirety of activity performed in association with the content item. An inferred activity distribution array is generated by applying the plurality of content-associated metrics to the attention distribution array. A filtered subset of activity distribution values is generated by pruning values from the inferred activity distribution array. A machine learning model is trained using the filtered subset of activity distribution values to generate a trained machine learning model. Transmission of content is controlled using the trained machine learning model.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
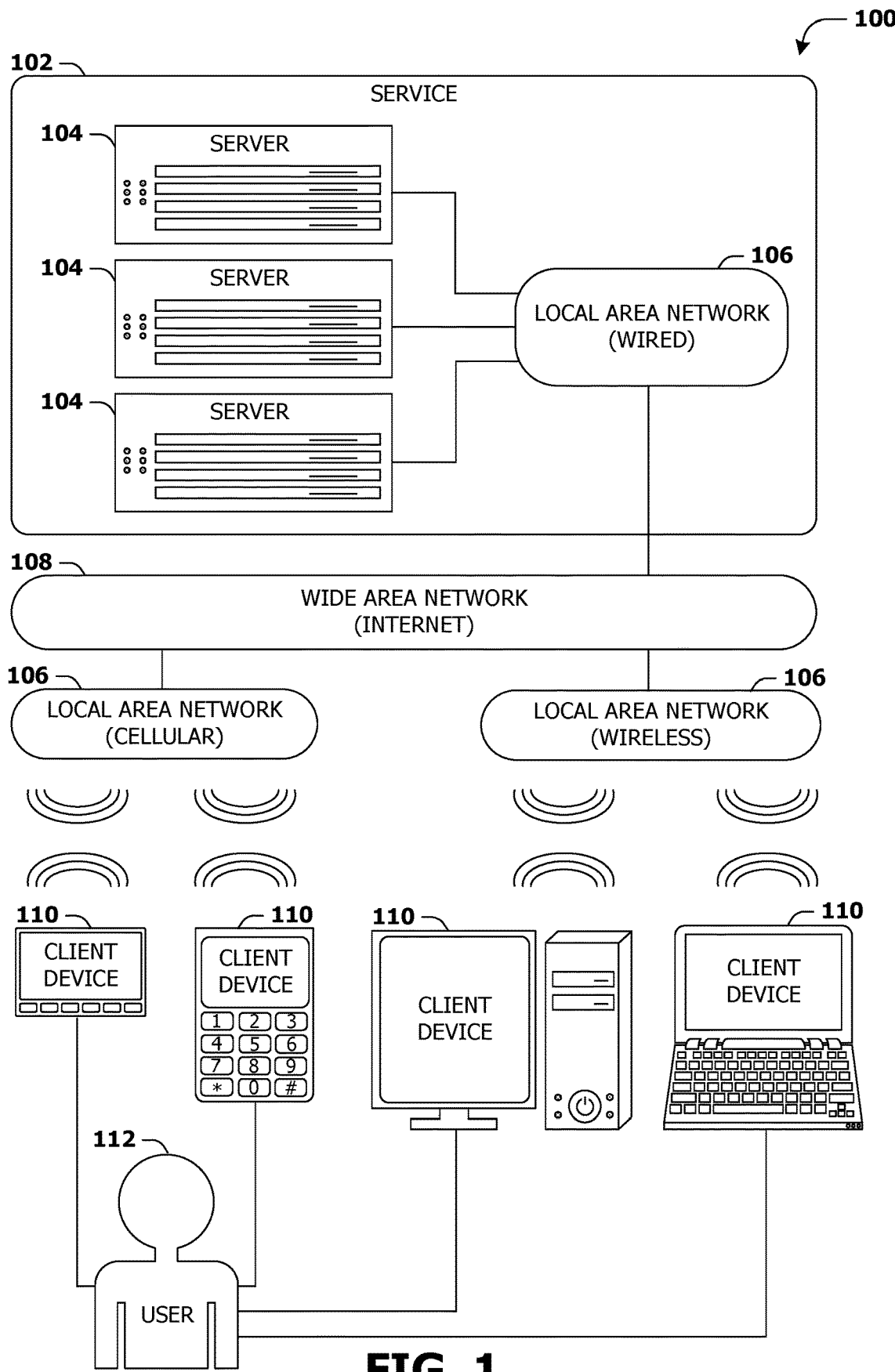
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
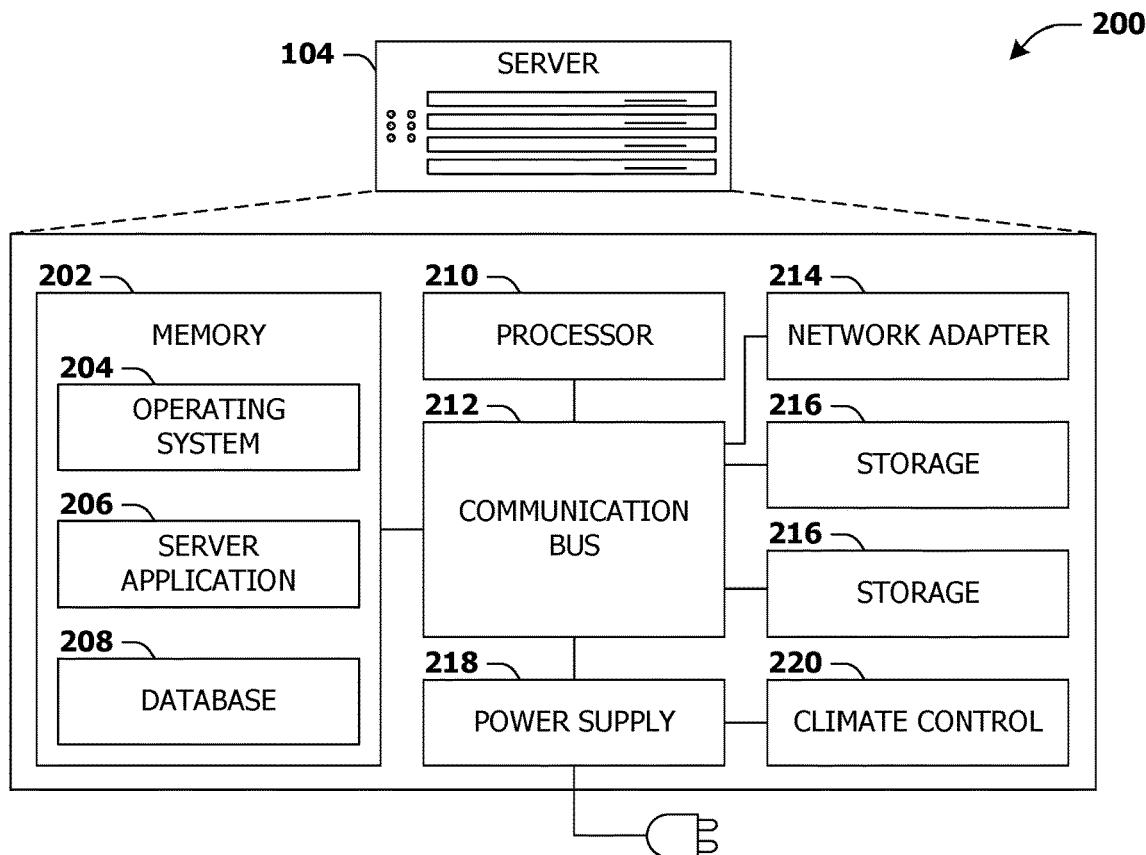
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
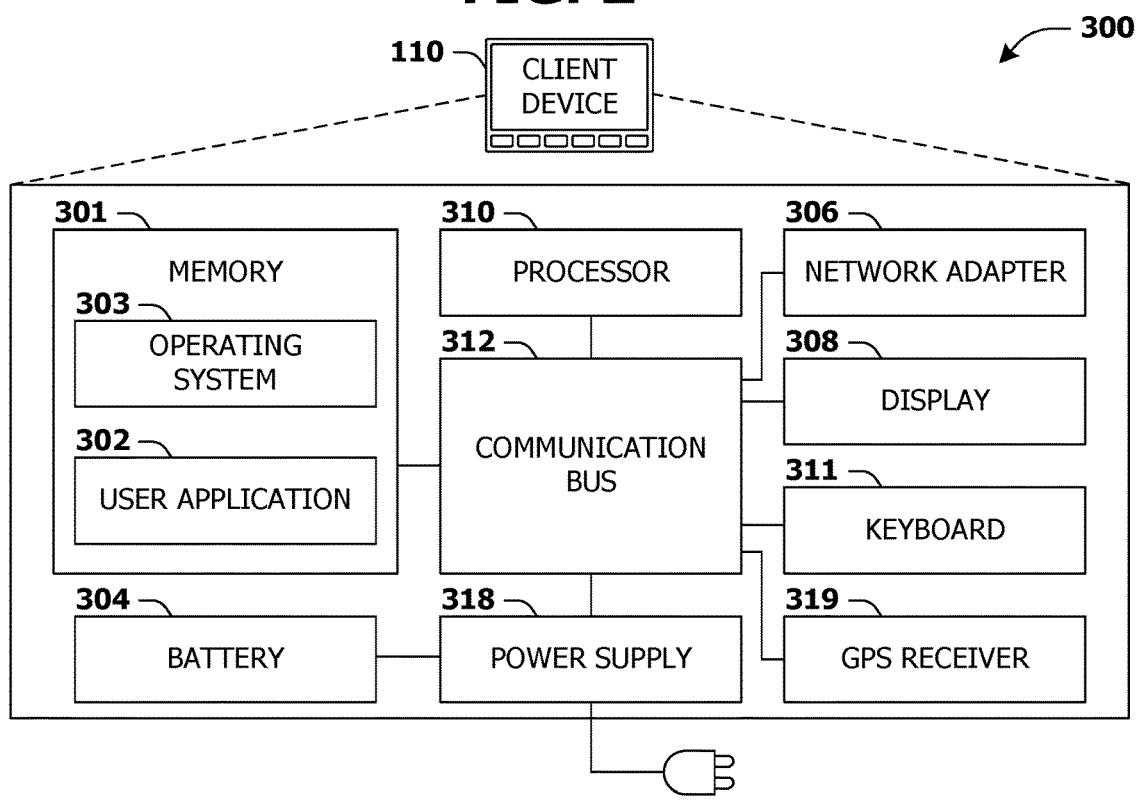
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining features and/or selecting content based upon the features are provided. For example, a user (and/or a client device associated with the user) may access and/or interact with a service, such as a browser, software, a website, an application, an operating system, etc. that provides a platform for viewing and/or downloading content from a server associated with a content system. In some examples, in response to receiving a request for content associated with the client device, the content system may select a content item, and provide the content item for presentation via the client device. However, if the user does not have an interest in the content item, presenting the content item may provide a negative experience for the user, and the user may be forced to close a window and/or navigate to another page. Accordingly, accurate selection of content may be beneficial to mitigate negative user experiences.

Thus, in accordance with one or more of the techniques presented herein, feedback features may be automatically determined based upon content events (e.g., recently detected content events), and may be used to accurately select content for presentation to users of the content system. In an example, first entities (e.g., user-level entities, such as topics, people, places, etc.) may be extracted from user profiles of users, and second entities (e.g., content-level entities, such as topics, people, places, etc.) may be determined based upon content items (e.g., news articles, informational articles, videos, advertisements, images, links, etc.) viewed and/or selected by users in the content events. First vector representations of the first entities and second vector representations of the second entities may be processed (e.g., using an attention model) to generate an attention distribution array. Each value of the attention distribution array may represent, for a user interested in a user-level entity of the first entities, a proportion of (i) entity-specific activity, of the user, related to a content-level entity of the second entities relative to (ii) an entirety of activity of the user. For example, a value of the attention distribution array may be associated with a user-level topic "Sports" extracted from the user profiles and a content-level topic "Politics" associated with the content items. Accordingly, the value may represent, for a user interested in the user-level topic "Sports", a proportion of (i) activity of the user that is related to the content-level topic "Politics" relative to (ii) an entirety of activity of the user.

User-associated metrics may be determined based upon the content events. Each user-associated metric may be associated with a user-level entity of the first entities, and may be representative of online activity of one or more users that have an interest in the user-level entity. An inferred activity distribution array is generated by applying the user-associated metrics to the attention distribution array. Each value of the inferred attention distribution array may represent an inferred measure of content events, of a user interested in a user-level entity of the first entities, related to a content-level entity of the second entities. For example, values of the first inferred activity distribution array may correspond to inferred user cross content feedback features (e.g., fine-grained user cross content feedback features) representative of relationships between activity associated with user-level entities and activity associated with content-level entities.

Values of the inferred activity distribution array may be automatically pruned (e.g., via TopK pooling, max pooling, average pooling, etc.) to generate a filtered subset of activity distribution values, which may be included in a set of features used to train a machine learning model configured to select content. Pruning the values may reduce the amount of data required for storing the set of features, and/or may reduce the amount of computations, computer resources and/or processing power performed to train the machine learning model and/or select content for users. For example, without pruning the values, the set of features used to train the machine learning model may comprise billions or trillions of activity distribution values. For example, the quantity of the activity distribution values without pruning may be equal to a product of a quantity of the first entities (e.g., around one million) and a quantity of the second entities (e.g., around one million), such as $1 \times 10^{12}$ activity distribution values, which may consume a significant amount of computer resources and/or storage, and/or may result in significant latency in training the machine learning model due to a large quantity of required computations. However, using the techniques provided herein to prune the values may result in the set of features comprising q features, where q may be about a sum of the quantity of the first entities and the quantity of the second entities (e.g., about two million).

Alternatively and/or additionally, the attention model used to process the first vector representations and the second vector representations may comprise a multi-head attention model that uses a plurality of heads with different parameters and/or different vector sub-spaces to generate a plurality of inferred activity distribution arrays. Values of the plurality of inferred activity distribution may be pruned to generate the filtered subset of activity distribution values. By generating the plurality of inferred activity distribution arrays using the different sets of parameters and/or the different vector sub-spaces, different arrays of the plurality of inferred activity distribution arrays may be reflective of inferences made by the multi-head attention model by looking at (e.g., analyzing) input data (e.g., the first plurality of vector representations and/or the second plurality of vector representations) from different perspectives, which may improve the accuracy of the filtered subset of activity distribution values and/or the machine learning model trained, thereby providing for more accurate selection of content by the machine learning model.

It may be appreciated that the techniques herein provide for an end-to-end pipeline including automatic determination of valuable and/or effective features from raw features (e.g., activity data from users) and content selection using the automatically determined features, thereby improving effectiveness and/or efficiency in learning and/or using the features for content selection and/or requiring significantly less manual effort as compared to systems that require manual (e.g., hand-crafted) feature creation by experts.

Further, the set of features determined using the techniques provided herein may have increased interpretability (e.g., such that an engineer can understand how content items are selected and/or debug a component that is not behaving as expected).

Alternatively and/or additionally, the set of features may be determined based upon real-time (e.g., near real-time) user activity. For example, features may be continuously and/or periodically determined in real-time (e.g., in near real-time and/or with low latency), and/or may be used to continuously and/or periodically train one or more machine learning models used in content selection. In this way, the one or more machine learning models may be trained in a dynamic manner to (e.g., quickly) respond to changes in user interactions over time, and thus may select content for users with increased accuracy.

Figure 4A:
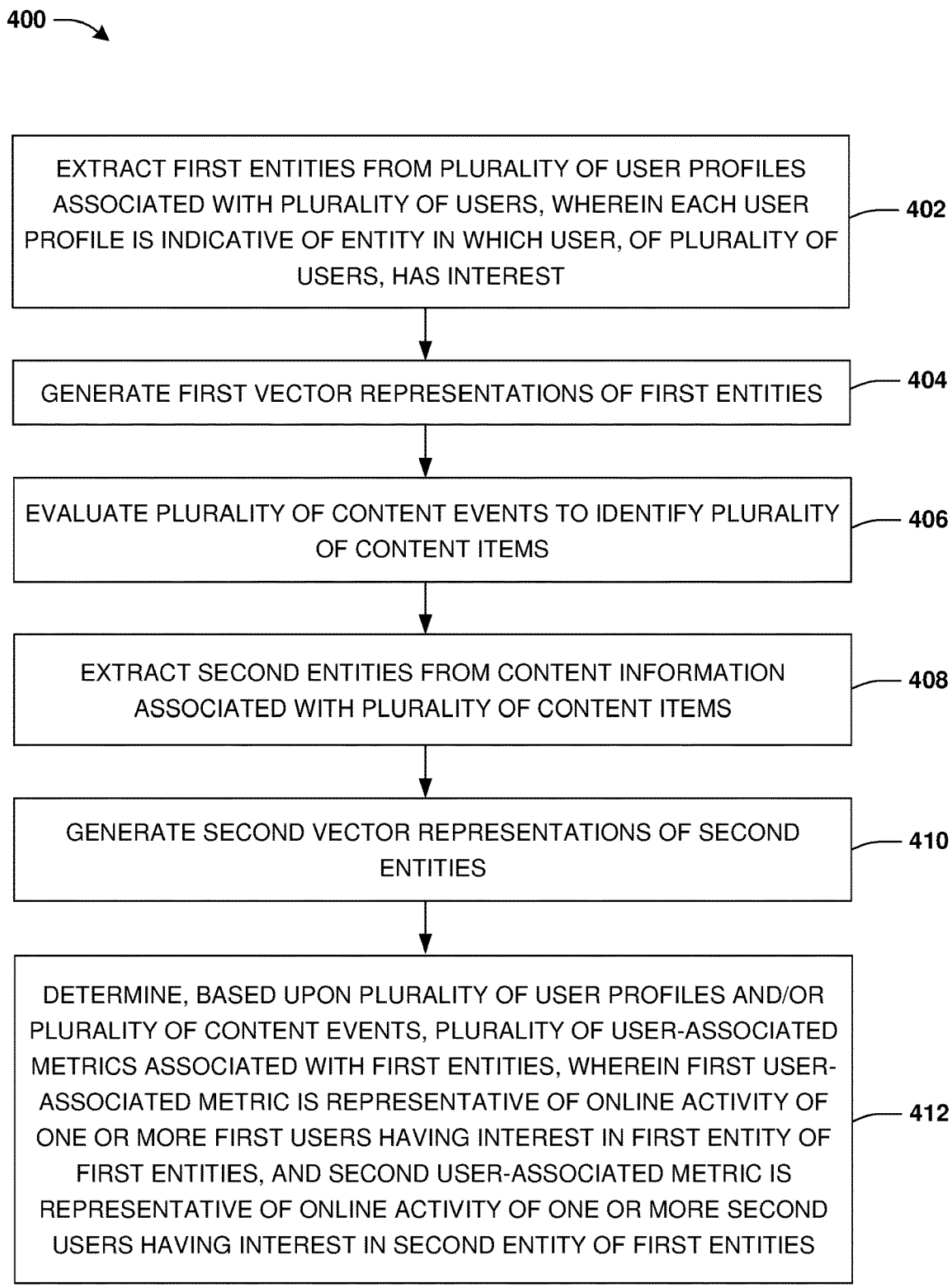
FIG. 4A is a first part of a flow chart illustrating an example method for determining features and/or selecting content based upon the determined features.
Figure 4B:
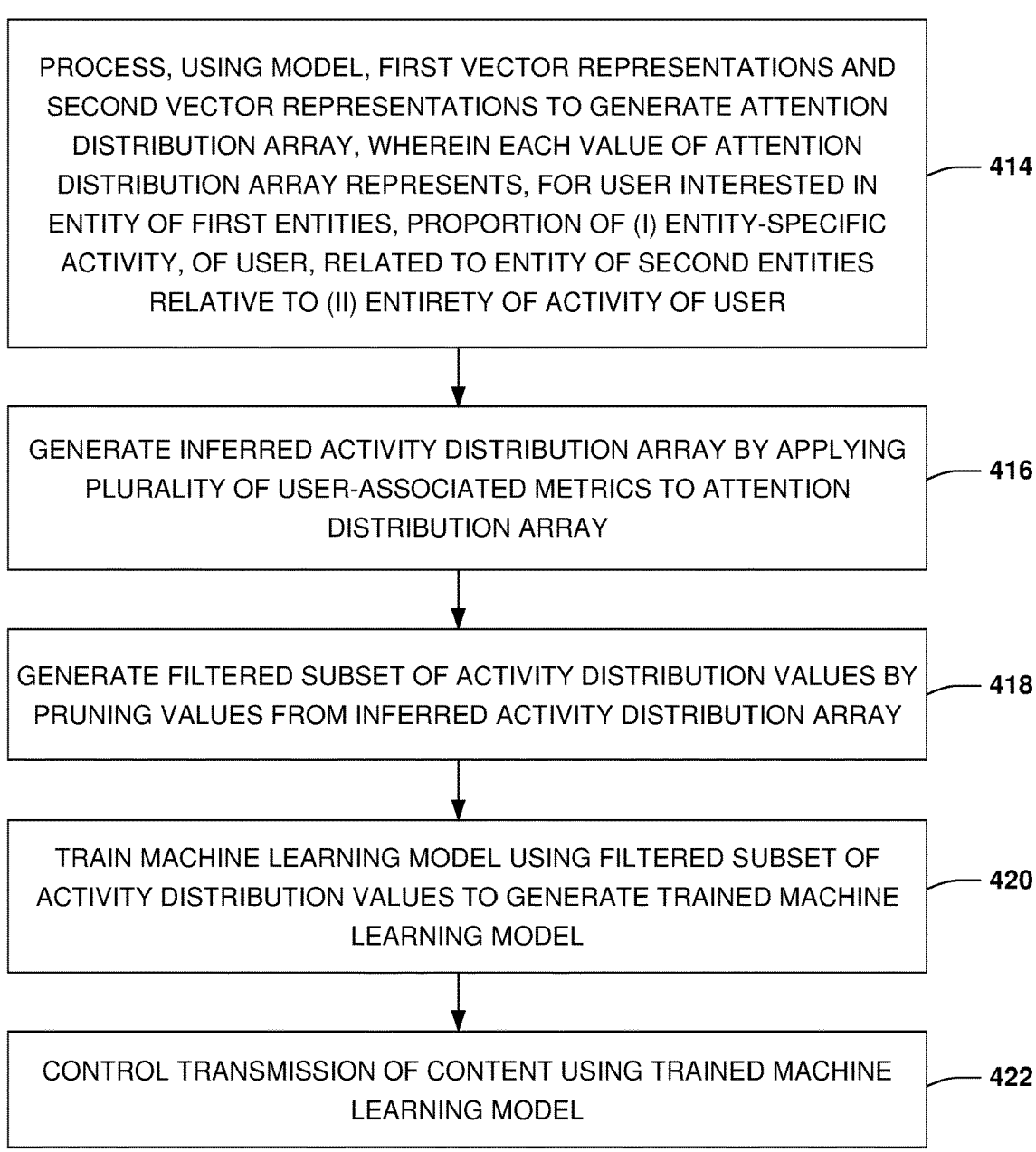
FIG. 4B is a second part of a flow chart illustrating an example method for determining features and/or selecting content based upon the determined features.

An embodiment of determining features and/or selecting content based upon the features is illustrated by an example method 400 of FIGS. 4A-4B. A content system for presenting content via devices may be provided. In some examples, the content system may provide content items (e.g., news articles, informational articles, videos, advertisements, images, links, etc.) to be presented via pages associated with the content system (e.g., pages providing search engines, email services, news content, communication services, etc.). For example, the pages may be associated with (e.g., accessed using) one or more applications (e.g., web applications, mobile applications, etc.), one or more websites, etc. associated with the content system. The content system may provide content items to be presented in (dedicated) locations throughout the pages (e.g., one or more areas of the pages configured for presentation of content items). For example, the content system may select a content item to present to a user, and present the content item at the top of a web page associated with the content system (e.g., within a banner area), at the side of the web page (e.g., within a column), in a pop-up window, overlaying content of the web page, etc. Alternatively and/or additionally, the content system may select a group of content items (e.g., links to at least one of news articles, videos, etc.) and present a list comprising the group of content items. For example, the list may correspond to a list of news articles, and a user interested in a given news article can select a corresponding content item in the list to access the news article.

The content system may monitor user activity, of a plurality of users, across a plurality of internet resources. An internet resource of the plurality of internet resources may be at least one of a web page, a website, an application (e.g., a client application, a mobile application, a platform, etc.). The content system may identify, in the user activity, a first plurality of content events. In some examples, the first plurality of content events may comprise presentation events, click events and/or search events. In some examples, the user activity may correspond to activity performed during a first period of time.

In some examples, a presentation event of the first plurality of content events may correspond to an event in which a content item (e.g., a content item provided by the content system) is presented via a client device associated with a user of the plurality of users. For example, the content item may be presented via the client device in response to receiving a request to present content via the client device (e.g., the request may be received in response to the user accessing an internet resource associated with the content system).

In some examples, a click event of the first plurality of content events may correspond to an event in which a content item (e.g., a content item provided by the content system) is presented via a client device and a selection (e.g., a click) of the content item is received via the client device (e.g., the content item may be selected by a user of the plurality of users).

In some examples, a search event of the first plurality of content events may correspond to an event in which a search query is input via a search interface and/or a search engine is used to generate a list of search results (e.g., various content items) based upon the search query.

In some examples, a first plurality of sets of event information associated with the first plurality of content events may be determined by the content system. For example, a set of event information of the first plurality of sets of event information may comprise information associated with an event of the first plurality of content events. In some examples, the set of event information may comprise content item information associated with a content item associated with the event (e.g., the content item may correspond to a content item that is presented and/or selected in the event), client information associated with a client device and/or a user associated with the event (e.g., a client device that receives, selects and/or presents the content item, and/or a user of the client device), and/or internet resource information associated with an internet resource associated with the event (e.g., the internet resource may correspond to an internet resource on which the content item is presented in the event). The internet resource may be at least one of a web page, a website, an application (e.g., a client application, a mobile application, a platform, etc.), etc.

In an example, the content item information may be indicative of at least one of (i) the content item associated with the event, (ii) a content item identifier that identifies the content item, (iii) a creator, publisher and/or author associated with the content item, (iv) a brand, advertiser and/or company associated with the content item, (v) one or more topics of the content item, (vi) one or more products and/or services associated with the content item (e.g., the content item may be used to advertise and/or promote the one or more products and/or services), (vii) a format of the content item (indicative of whether the content item is audio, video or an image, for example), (viii) a duration and/or size of the content item, etc.

In an example, the client information may be indicative of at least one of (i) the client device, (ii) a device identifier associated with the client device, (iii) an IP address associated with the client device, (iv) a media access control (MAC) address associated with the client device, (v) a carrier identifier indicative of carrier information associated with the client device, (vi) a user identifier (e.g., at least one of a username, an email address, a user account identifier, etc.) associated with the client device and/or the user, (vii) a browser cookie (and/or a cookie identifier associated with the client device), (viii) activity information (e.g., search history information, website browsing history, email information, etc.) associated with the client device, the user identifier and/or the user, (ix) user demographic information (e.g., age, gender, etc.) associated with the client device, the user identifier and/or the user, (x) location information associated with the client device, the user identifier and/or the user, etc. In some examples, the client information may be determined based upon information received from the client device (and/or one or more other devices associated with the user and/or a user account associated with the user). Alternatively and/or additionally, the client information may be generated based upon information received from servers associated with internet resources (e.g., at least one of web pages, applications, mobile applications, etc.) accessed and/or visited by the client device and/or the user.

In an example, the internet resource information may be indicative of at least one of an internet resource identifier (e.g., a web address) associated with the internet resource, a domain (e.g., a domain name, a top-level domain, etc.) associated with the internet resource, an application identifier associated with the internet resource (e.g., an application), etc.

One or more first sets of event information of the first plurality of sets of event information may be associated with one or more first content events of the first plurality of content events. The one or more first content events may be associated with activity of a first client device (and/or a first user associated with the first client device).

FIGS. 5A-5D illustrate examples of a system 501 for providing content to devices and/or identifying content events, described with respect to the method 400 of FIGS. 4A-4B. Examples of one or more first content events associated with the first client device (shown with reference number 500 in FIG. 5A) are shown in FIGS. 5A-5D. The first user (and/or the first client device 500) may access and/or interact with a service, such as a browser, software, a website, an application, an operating system, an email interface, a messaging interface, a music-streaming application, a video application, etc. that provides a platform for accessing internet resources and/or viewing and/or downloading content from a server associated with the content system.

Figure 5A:
FIG. 5A is a component block diagram illustrating an example system for providing content to devices, where a client device presents and/or accesses a first webpage.

FIG. 5A illustrates the first client device 500 presenting and/or accessing a first web page 508 using a browser of the first client device 500. The browser may comprise an address bar 502 comprising a web address (e.g., a uniform resource locator (URL)) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

In some examples, the one or more first content events associated with the first client device 500 (and/or the first user) may comprise a search event associated with the first user searching for information related to the search query "stock market" using the web search engine. The one or more first sets of event information may comprise a set of event information, associated with the search event, indicative of the search query "stock market".

Figure 5B:
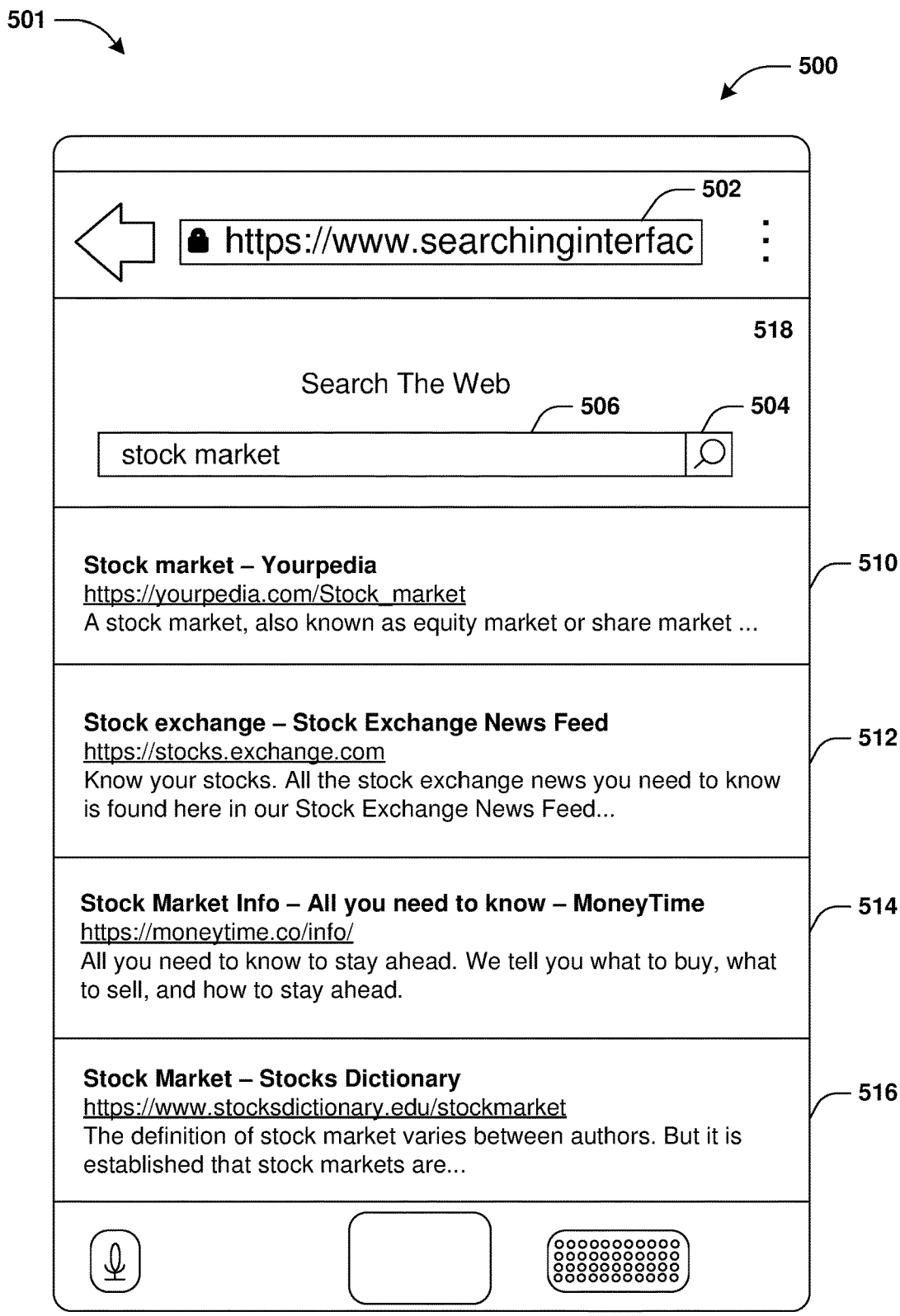
FIG. 5B is a component block diagram illustrating an example system for providing content to devices, where a client device presents a plurality of search results associated with a query.

FIG. 5B illustrates the first client device 500 presenting a plurality of search results associated with the query using the browser of the first client device 500. For example, the plurality of search results may be presented within a second web page 518. For example, the plurality of search results may comprise a first search result 510 corresponding to a third web page, a second search result 512 corresponding to a fourth web page 544 (illustrated in FIG. 5C), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 544 may be selected (e.g., the second search result 512 may be selected via a second selectable input corresponding to the second search result 512).

In some examples, the one or more first content events associated with the first client device 500 (and/or the first user) may comprise presentation events associated with the presentation of the plurality of search results via the first client device 500. For each search result that is presented via the first client device 500, the one or more first sets of event information may comprise a set of event information indicative of at least one of the search result, one or more topics (e.g., stock market, economy, etc.) of the search result, etc.

Alternatively and/or additionally, the one or more first content events associated with the first client device 500 (and/or the first user) may comprise a click event associated with the selection of the second search result 512. For example, the one or more first sets of event information may comprise a set of event information indicative of the second search result 512 being selected.

Figure 5C:
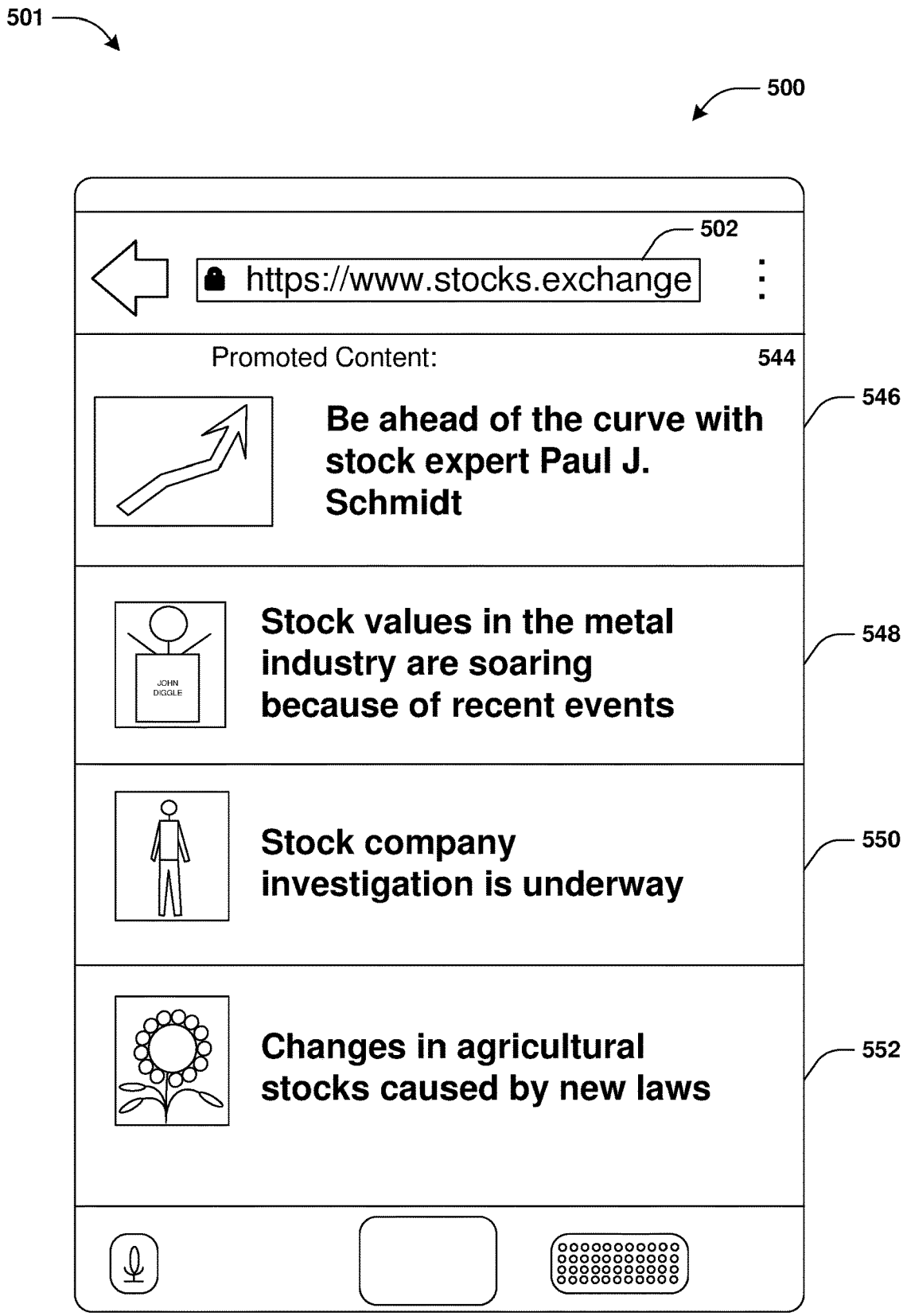
FIG. 5C is a component block diagram illustrating an example system for providing content to devices, where a client device presents and/or accesses a fourth web page displaying a content item.

FIG. 5C illustrates the fourth web page 544 being presented via the first client device 500 in response to the selection of the second search result 512. The fourth web page 544 may comprise an advertisement 546 and/or a list of news items corresponding to news articles. The list of news items may comprise a news item 548, a news item 550 and/or a news item 552. In some examples, each news item may be a selectable list item and may be associated with a news article, wherein in response to a selection of the news item (e.g., the selectable list item), the news article may be displayed on the first client device 500.

In some examples, the one or more first content events associated with the first client device 500 (and/or the first user) may comprise a presentation event associated with the presentation of the advertisement 546. Alternatively and/or additionally, the one or more first content events associated with the first client device 500 (and/or the first user) may comprise presentation events associated with the presentation of the news items 548, 550, and/or 552.

Figure 5D:
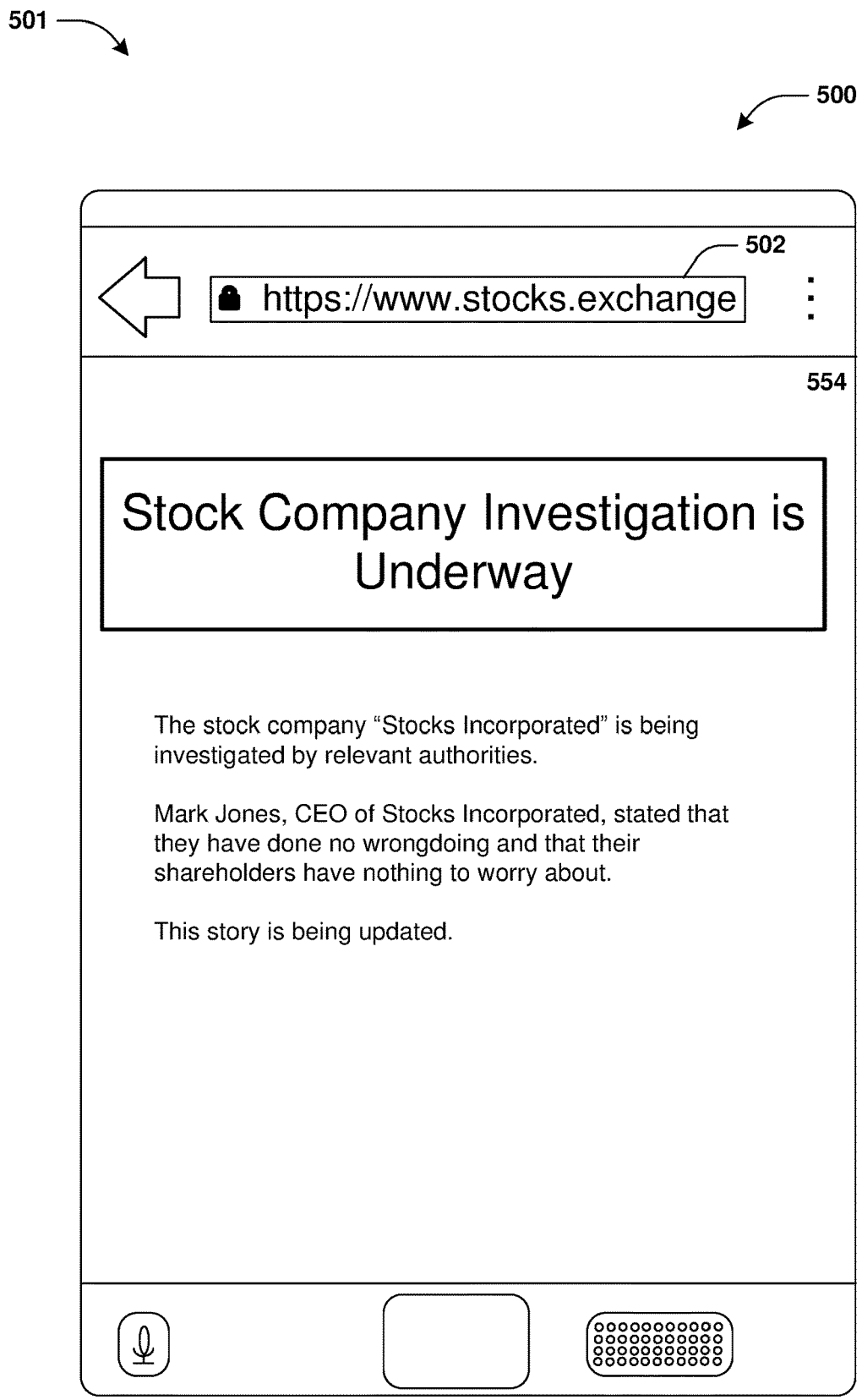
FIG. 5D is a component block diagram illustrating an example system for providing content to devices, where a client device presents and/or accesses a seventh web page in response to a selection of a content item.

In some examples, a selection of the second news item 550 may be received. FIG. 5D illustrates the first client device 500 presenting a seventh web page 554 comprising a news article corresponding to the second news item 550 in response to the selection of the second news item 550. In some examples, the one or more first content events associated with the first client device 500 (and/or the first user) may comprise a click event associated with the selection of the second news item 550 and/or a presentation event associated with the presentation of the news article corresponding to the second news item 550.

In some examples, the content system may generate a plurality of user profiles associated with the plurality of users based upon the first plurality of content events. For example, the plurality of user profiles may be generated based upon the first plurality of sets of event information associated with the first plurality of content events. The plurality of user profiles may be stored in a user profile data store of the content system. The plurality of user profiles may comprise a first user profile associated with the first user and/or the first client device 500. The first user profile may comprise at least one of first user interest information, first activity information (e.g., activity information associated with at least one of the first client device 500, the first user, a first user identifier associated with the first client device 500 and/or the first user, etc.), first user demographic information (e.g., user demographic information associated with at least one of the first client device 500, the first user, the first user identifier, etc.), first location information (e.g., location information associated with at least one of the first client device 500, the first user, the first user identifier, etc.), first client information associated with the first client device 500 and/or the first user, etc.

In some examples, the first user interest information in the first user profile is indicative of one or more first entities in which the first user is determined to have an interest. For example, the one or more first entities may comprise one or more topics, one or more subjects, etc. that are expressed, discussed, etc. in content that the first user accessed and/or consumed. The one or more first entities may be determined based upon the one or more first content events (and/or the one or more first sets of event information) associated with the first user. For example, search queries and/or content items associated with the one or more first content events may be analyzed to determine the one or more first entities. The one or more first entities may comprise at least one of (i) one or more places (e.g., countries, cities, geographic locations, etc.), (ii) one or more people (e.g., people of a particular location, people with a particular occupation, politicians, celebrities, socialites, etc.), (ii) one or more things (e.g., devices, natural objects, etc.), (iii) one or more organizations, (iv) one or more ideas, (v) one or more topics, (vi) one or more systems, (vii) one or more events, (viii) one or more historical events, (ix) one or more current events, (x) one or more abstract objects, (xi) one or more physical objects, etc.

In an example, one or more entities associated with the news article (e.g., shown in FIG. 5D) may be selected for inclusion in the one or more first entities of the first user profile. The one or more entities associated with the news article may be determined by analyzing the news article using one or more named entity recognition (NER) and/or topic detection techniques and/or by comparing the news article with one or more resources (e.g., an encyclopedia, an online encyclopedia, a news channel, a news website, a website, a book, a research article, a research article database and/or a different type of information database, etc.) to identify the one or more entities. In the example shown in FIG. 5D, the one or more entities may comprise at least one of a topic "stock market", a topic "economy", a company "Stocks Incorporated", a person "Mark Jones", etc.

In some examples, the first user interest information in the first user profile may be indicative of one or more affinity scores associated with the one or more first entities. For example, an affinity score of the one or more affinity scores may be indicative of an affinity (e.g., level of interest) of the first user to a particular entity of the one or more first entities. In some examples, the one or more affinity scores may comprise a first affinity score indicative of an affinity of the first user to the topic "stock market". The one or more first content events (and/or the one or more first sets of event information associated with the one or more first content events) may be analyzed to determine a measure of content events associated with the topic "stock market". For example, the measure of content events may correspond to a quantity of content items about the topic "stock market" that have been accessed by the first client device 500 and/or the first user. In an example, the first affinity score may be a function of the measure of content events (and/or one or more other values), where an increase in the measure of content events may correspond to an increase of the first affinity score (e.g., the measure of content events being larger may be reflective of the first user having a greater interest in the topic "stock market"). In some examples, an entity may be included in the one or more first entities of the first user profile based upon a determination that an affinity score indicating an affinity of the first user to the entity exceeds a threshold affinity. In this way, the one or more first entities indicated by the first user profile may correspond to entities in which the first user is likely to have an interest above a threshold level of interest.

Figure 6A:
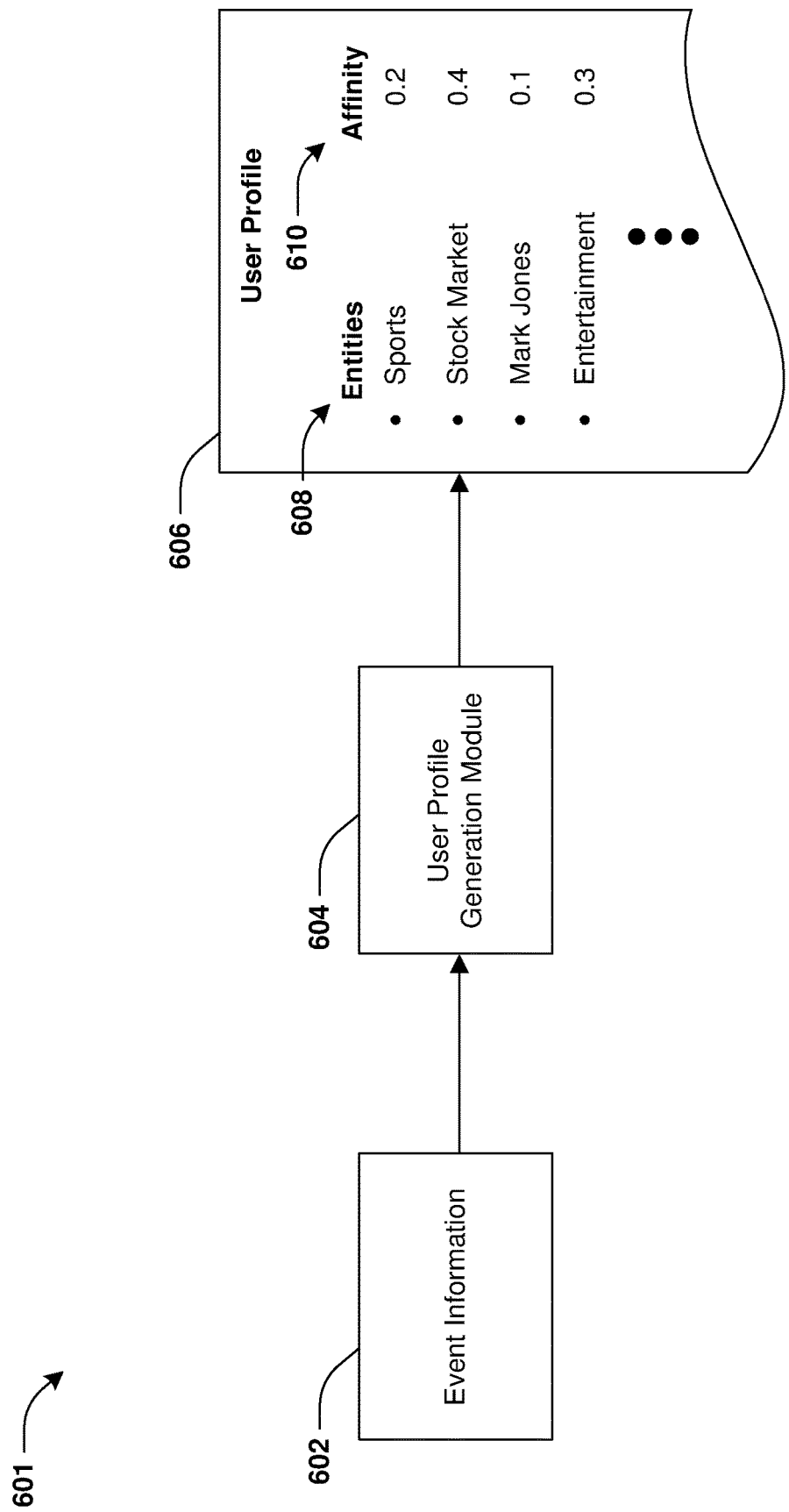
FIG. 6A is a component block diagram illustrating an example system for determining features and/or selecting content based upon the determined features, where a user profile is generated using a user profile generation module.

FIGS. 6A-6J illustrate a system 601 for selecting content for transmission to devices, described with respect to the method 400 of FIGS. 4A-4B. FIG. 6A illustrates generation of the first user profile (shown with reference 606). Event information 602 comprising the one or more first sets of event information associated with the one or more first content events may be input to a user profile generation module 604, which may use the event information 602 to generate the first user profile 606. The one or more first entities (shown with reference number 608) of the first user profile 606 may comprise a topic "Sports", the topic "Stock Market", a person "Mark Jones", and/or a topic "Entertainment". The one or more affinity scores (shown with reference number 610) may comprise an affinity score of 0.2 associated with the topic "Sports", an affinity score of 0.4 associated with the topic "Stock Market", an affinity score of 0.1 associated with the person "Mark Jones", and/or an affinity score of 0.3 associated with the topic "Entertainment". In some examples, the one or more affinity scores 610 may be normalized to have a sum equal to 1 (or other value).

Other user profiles of the plurality of user profiles may be determined using one or more of the techniques provided herein with respect to determining the first user profile 606.

At 402 (shown in FIG. 4A), a first plurality of entities may be extracted from the plurality of user profiles associated with the plurality of users. For example, the first plurality of entities may comprise some and/or all entities indicated by the plurality of user profiles (e.g., the first plurality of entities may comprise the one or more first entities indicated by the first user profile 606, one or more second entities indicated by a second user profile of the plurality of user profiles, etc.).

At 404 (shown in FIG. 4A), a first plurality of vector representations of the first plurality of entities may be generated. The first plurality of vector representations may be generated based upon supplemental information associated with the first plurality of entities. The supplemental information may be retrieved from one or more first remote devices (e.g., one or more first remote servers). For example, supplemental information may be retrieved for each of the first plurality of entities.

In an example, the first plurality of vector representations may comprise a first vector representation of a first entity (e.g., the topic "Sports"). The first vector representation of the first entity may be generated based upon a first set of supplemental information retrieved from the one or more first remote devices. In some examples, the one or more first remote devices may comprise a first informational database. The first set of supplemental information may comprise an informational article retrieved from the first informational database. For example, the content system may transmit a request, indicative of the first entity, to the first informational database, and the first informational database may provide the content system with the informational article in response to the request. In an example in which the first entity corresponds to the topic "Sports", the informational article may be an article about sports.

In some examples, the first informational database may be associated with a web encyclopedia (e.g., a web-based encyclopedia). In some examples, informational articles stored on the first informational database may be edited by editors associated with the first informational database (e.g., information and/or content may be added to informational articles stored on the first informational database, information and/or content may be removed from informational articles stored on the first informational database, etc.). Alternatively and/or additionally, the first informational database may be based upon a model of openly editable content where informational articles stored on the first informational database may be edited by one or more of users, computers (e.g., bots), etc. via editing processes associated with the first informational database (in accordance with rules and/or guidelines associated with the first informational database).

In some examples, the informational article (e.g., an encyclopedia article about sports) may be identified based upon a determination that a title and/or a header of the informational article comprises, is similar to and/or matches the first entity (e.g., the title and/or the header comprises the term "sports"). Alternatively and/or additionally, the informational article may be identified based upon a determination that the informational article is about the first entity. In some examples, the informational article may comprise a definition and/or description of the first entity.

Figure 6B:
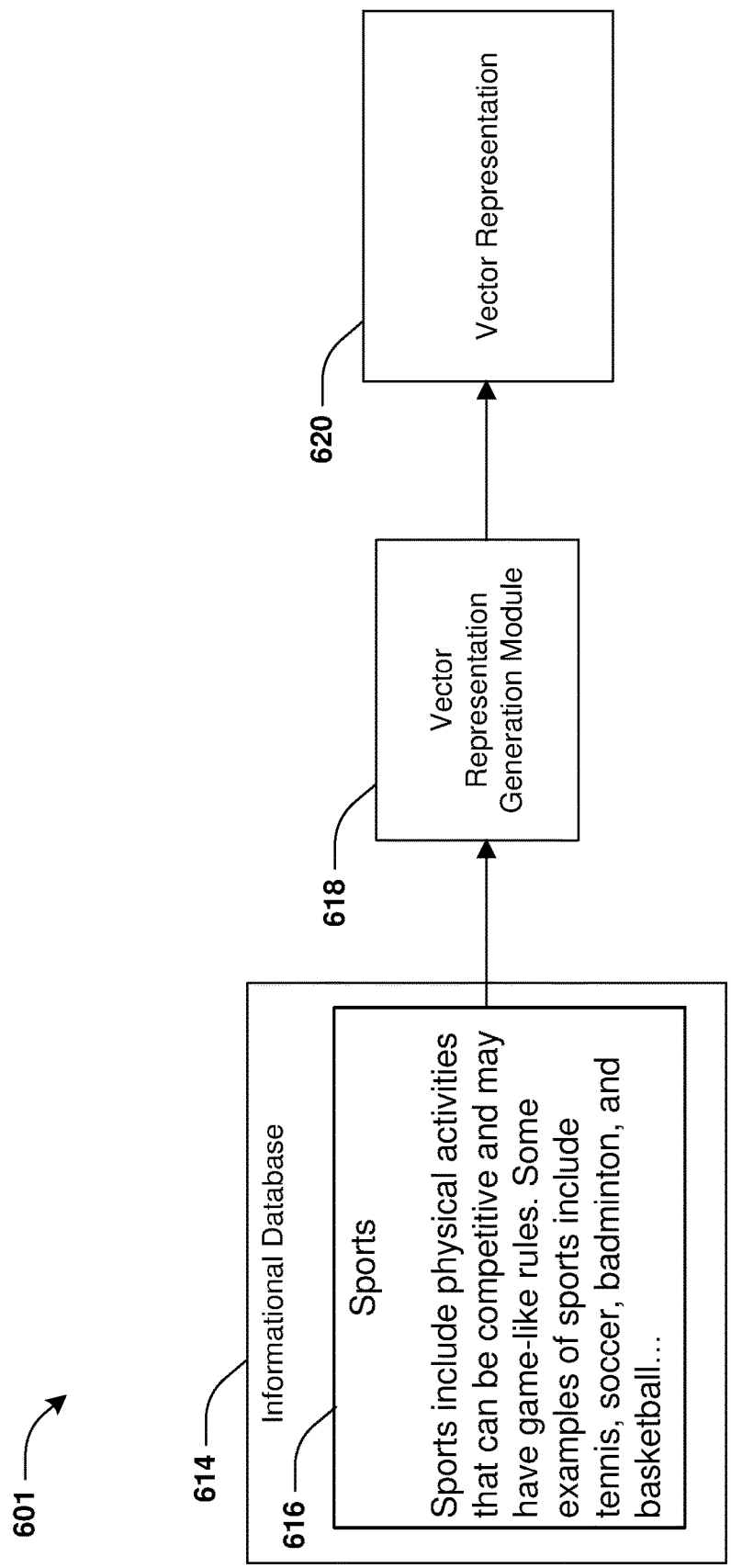
FIG. 6B is a component block diagram illustrating an example system for determining features and/or selecting content based upon the determined features, where a vector representation of an entity is generated using a vector representation generation module.

FIG. 6B illustrates generation of the first vector representation (shown with reference number 620). The informational article (shown with reference number 616) associated with the first entity (e.g., the topic "Sports") may be retrieved from the first informational database (shown with reference number 614) and/or input to a vector representation generation model 618. The vector representation generation model 618 may generate the first vector representation 620 based upon the informational article 616. In some examples, the first vector representation 620 may comprise a semantic representation (e.g., a latent semantic representation), such as an embedding-based representation, of the informational article 616. In some examples, the first vector representation 620 may be generated based upon one or more first affinity scores, associated with the first entity, indicated by one or more user profiles that comprise indications of the first entity. In an example in which the first entity corresponds to the topic "Sports", the one or more first affinity scores may comprise the affinity score (associated with the topic "Sports") indicated by the first user profile 606 (e.g., the affinity score of 0.2), an affinity score indicated by another user profile associated with another user determined to have an interest in the topic "Sports", etc. For example, the first vector representation 620 may be scaled by the one or more first affinity scores (such that the first vector representation 620 is reflective of users' affinity to the first entity, for example).

Other vector representations of the first plurality of vector representations may be determined using one or more of the techniques provided herein with respect to determining the first vector representation 620.

At 406 (shown in FIG. 4A), a second plurality of content events may be evaluated to identify a plurality of content items (e.g., news articles, informational articles, videos, advertisements, images, links, etc.). In some examples, the second plurality of content events may be the same as the first plurality of content events. Alternatively and/or additionally, the second plurality of content events may be different than the first plurality of content events. In some examples, the second plurality of content events may comprise a subset of the first plurality of content events. Alternatively and/or additionally, the second plurality of content events may be correspond to events identified from user activity performed during a second period of time. The second period of time may comprise at least a part of the first period of time (associated with the first plurality of content events). Alternatively and/or additionally, the second period of time may be after the first period of time, and/or may end at about a current time (e.g., the second period of time may span five minutes, and the second plurality of content events may correspond to content events identified from user activity performed and/or logged during the most recent five minutes). For example, the second plurality of content events may be detected and/or evaluated (to identify the plurality of content items) using a real-time system (e.g., comprising one or more low latency computers) of the content system. The real-time system may correspond to a near real-time (and/or low latency) system. The real-time system may (i) receive user activity signals, associated with the second plurality of content events, over the second period of time, (ii) evaluate the user activity signals to identify the second plurality of content events and/or determine a second plurality of sets of event information associated with the second plurality of content events (e.g., the second plurality of sets of event information may be determined using one or more of the techniques provided herein with respect to determining the first plurality of sets of event information), and/or (iii) evaluate the second plurality of content events to identify the plurality of content items. The plurality of content items may comprise content items presented to users via presentation events of the second plurality of content events and/or content items selected by users via selection events of the second plurality of content events. In some examples, evaluating the second plurality of content events may comprise analyzing content item information in the second plurality of sets of event information (e.g., the content item information may be indicative of content items presented to users via the presentation events and/or content items selected by users via the selection events) to identify the plurality of content items.

At 408 (shown in FIG. 4A), a second plurality of entities may be extracted from content information associated with the plurality of content items. For example, the content information may comprise a plurality of sets of content information associated with the plurality of content items. For example, the second plurality of entities may comprise a first set of entities (e.g., a first set of one or more entities) extracted from a first set of content information (of the plurality of sets of content information) associated with a first content item of the plurality of content items, a second set of entities (e.g., a second set of one or more entities) extracted from a second set of content information (of the plurality of sets of content information) associated with a second content item of the plurality of content items, etc.

Figure 6C:
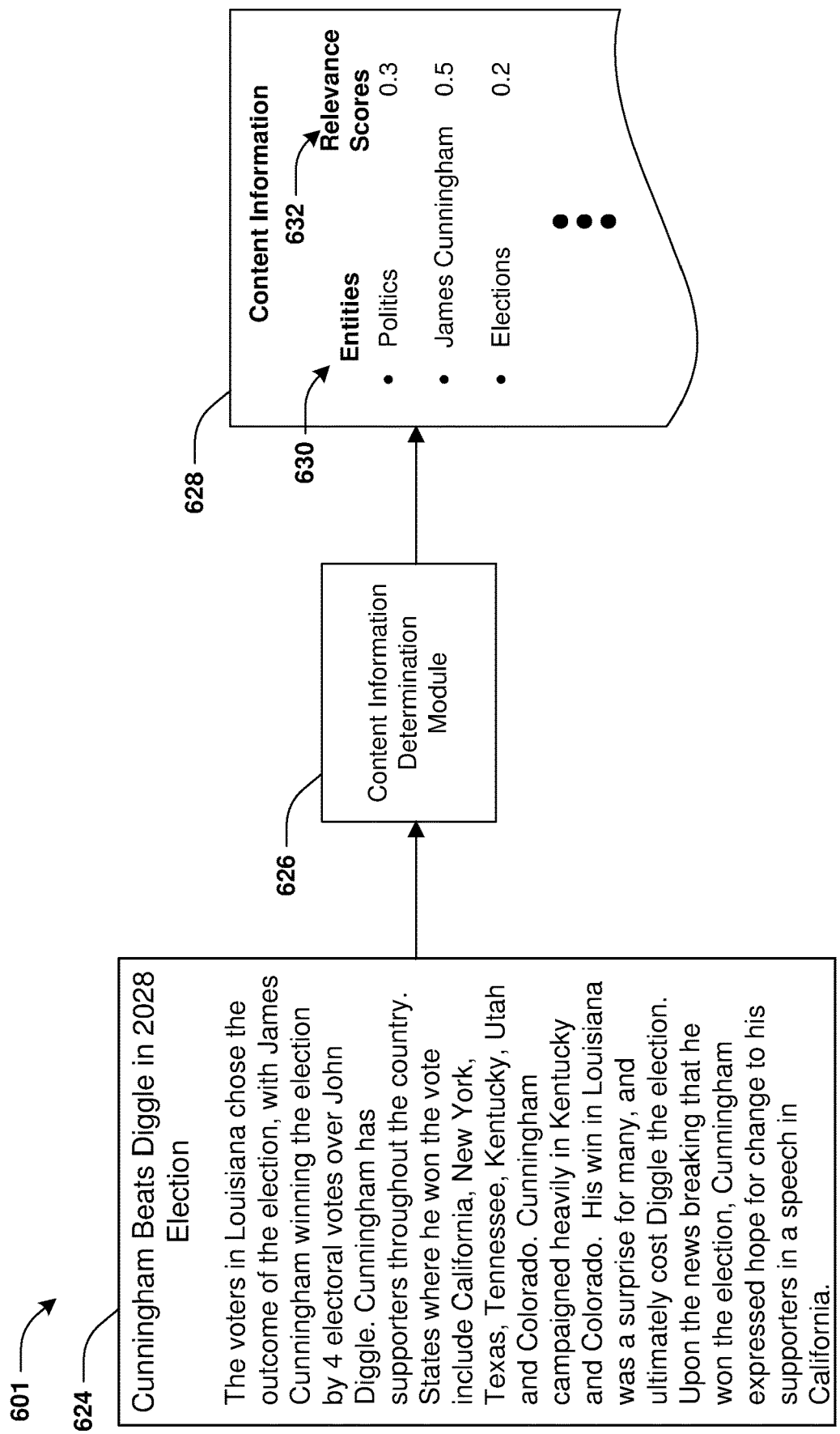
FIG. 6C is a component block diagram illustrating an example system for determining features and/or selecting content based upon the determined features, where content information associated with a content item is determined using a content information determination module.

In some examples, the content system may analyze the plurality of content items to determine the content information. FIG. 6C illustrates the first set of content information (shown with reference number 628) determined based upon the first content item (shown with reference number 624). In FIG. 6C, the first content item 624 may correspond to a news article, and may be input to a content information determination module 626. The content information determination module 626 may determine the first set of content information 628 based upon the first content item 624. The first set of content information 628 may be indicative of the first set of entities (shown with reference number 630) and/or one or more first relevance scores 632 associated with the first set of entities 630.

The first set of entities 630 associated with the news article may be determined by analyzing the news article using one or more NER and/or topic detection techniques and/or by comparing the first content item 624 with one or more resources (e.g., an encyclopedia, an online encyclopedia, a news channel, a news website, a website, a book, a research article, a research article database and/or a different type of information database, etc.) to identify the first set of entities 630. In the example shown in FIG. 6C, the first set of entities 630 may comprise at least one of a topic "Politics", a person "James Cunningham", a topic "Elections", etc.

The one or more first relevance scores 632 may comprise a relevance score "0.3" (e.g., an aboutness score, an importance score) associated with a second entity (e.g., the topic "Politics"). In some examples, the relevance score associated with the second entity may correspond to a measure of relevance and/or importance (e.g., contextual relevance and/or importance) of the second entity to the first content item 624. The relevance score may be determined by analyzing the first content item 624 based upon the second entity. In some examples, the relevance score associated with the second entity may be determined using one or more machine learning techniques. For example, the relevance score and/or other relevance scores of the one or more first relevance scores 632 may be generated using a machine learning model based upon at least one of the first content item 624, the first set of entities 630, etc. In some examples, the one or more first relevance scores 632 (e.g., the relevance score "0.3" associated with the topic "Politics", a relevance score "0.5" associated with the person "James Cunningham", a relevance score "0.2" associated with the topic "Elections", etc.) may be normalized to have a sum equal to 1 (or other value).

At 410 (shown in FIG. 4A), a second plurality of vector representations of the second plurality of entities may be generated. The second plurality of vector representations may be generated based upon supplemental information associated with the second plurality of entities. The supplemental information may be retrieved from one or more second remote devices (e.g., one or more second remote servers). For example, supplemental information may be retrieved for each of the second plurality of entities. The one or more second remote devices may be the same as the one or more first remote devices. Alternatively and/or additionally, the one or more second remote devices may be different than the one or more first remote devices.

In an example, the second plurality of vector representations may comprise a second vector representation of the second entity (e.g., the topic "Politics"). The second vector representation of the second entity may be generated based upon a second set of supplemental information retrieved from the one or more second remote devices. In some examples, the one or more second remote devices may comprise a second informational database (which may be the same as or different than the first informational database 614). The second set of supplemental information may comprise a second informational article retrieved from the second informational database. For example, the content system may transmit a request, indicative of the second entity, to the second informational database, and the second informational database may provide the content system with the second informational article in response to the request. In an example in which the second entity corresponds to the topic "Politics", the second informational article may be an article about politics.

In some examples, the second informational database may be associated with a web encyclopedia (e.g., a web-based encyclopedia). In some examples, the second informational article (e.g., an encyclopedia article about sports) may be identified based upon a determination that a title and/or a header of the second informational article comprises, is similar to and/or matches the second entity (e.g., the title and/or the header comprises the term "sports"). Alternatively and/or additionally, the second informational article may be identified based upon a determination that the second informational article is about the second entity. In some examples, the second informational article may comprise a definition and/or description of the second entity. The second vector representation may be generated based upon the second informational article. In some examples, the second vector representation may comprise a semantic representation (e.g., a latent semantic representation), such as an embedding-based representation, of the second informational article. In some examples, the second vector representation may be generated based upon one or more second relevance scores (e.g., aboutness scores), associated with the second entity, indicated by one or more sets of content information (e.g., the first set of content information 628 shown in FIG. 6C) that comprise indications of the second entity. In an example in which the second entity corresponds to the topic "politics", the one or more second relevance scores may comprise the relevance score (associated with the topic "politics") indicated by the first set of content information 628 (e.g., the relevance score of 0.3), a relevance score indicated by another set of content information associated with another content item (of the plurality of content items) determined to be about the topic "politics", etc. For example, the second vector representation may be scaled by the one or more second relevance scores (such that the second vector representation is reflective of a relevance of the second entity to content items of the plurality of content items, for example).

Other vector representations of the second plurality of vector representations may be determined using one or more of the techniques provided herein with respect to determining the second vector representation.

At 412 (shown in FIG. 4A), a plurality of user-associated metrics associated with the first entities may be determined. In some examples, a user-associated metric of the plurality of user-associated metrics may be representative of online activity of one or more users having an interest in an entity of the first plurality of entities. For example, the plurality of user-associated metrics may comprise a first user-associated metric representative of online activity of one or more first users having an interest in the first entity of the first plurality of entities, a second user-associated metric representative of online activity of one or more second users having an interest in a third entity of the first plurality of entities, etc.

In some examples, the first user-associated metric may be indicative of a measure of events (e.g., presentation events or click events) of the one or more first users. The plurality of user profiles may be analyzed based upon the first entity to identify the one or more first users. For example, the one or more first users may be identified based upon a determination that, for each user of the one or more first users, a corresponding user profile comprises an indication that the user has an interest in the first entity. The first user-associated metric may comprise a quantity of events (e.g., a quantity of presentation events or a quantity of click events) of the one or more first users. In an example, the one or more first users may comprise the first user and a second user associated with the second user profile, wherein the quantity of presentation events corresponds to a sum of a quantity of events (e.g., presentation events or click events) performed by the first user and a quantity of events (e.g., presentation events or click events) performed by the second user. Alternatively and/or additionally, the first user-associated metric may comprise a rate at which the one or more first users perform events (e.g., a quantity of events per unit of time).

Alternatively and/or additionally, the first user-associated metric may comprise a combination (e.g., an average) of individual measures of events (e.g., presentation events or click events) associated with the one or more first users. In an example, the first user-associated metric may be determined by combining (e.g., averaging) at least one of a measure (e.g., a quantity or a rate) of events (e.g., presentation events or click events) performed by the first user, a measure (e.g., a quantity or a rate) of events (e.g., presentation events or click events) performed by the second user, etc.

In some examples, the first user-associated metric may be determined based upon the second plurality of content events, and/or may be representative of online activity of the one or more first users during the second period of time (e.g., the most recent five minutes). For example, the one or more first users may be identified as having an interest in the first entity based upon the plurality of user profiles, and, in response to identifying the one or more first users, the second plurality of content events may be evaluated (e.g., by analyzing the second plurality of sets of event information) to identify a set of content events, of the second plurality of content events, that are associated with the one or more first users. In an example, a content event of the set of content events may be determined to be associated with the first user of the one or more first users based upon a determination that a set of event information associated with the content event is indicative of client information (e.g., at least one of a device identifier, an IP address, a MAC address, a carrier identifier, a user identifier, a browser cookie, etc.) that matches the first client information indicated by the first user profile 606 associated with the first user. The first user-associated metric may be determined based upon the set of content events, such as based upon a quantity of content events (e.g., presentation events or click events) of the set of content events.

Alternatively and/or additionally, the first user-associated metric may be representative of online activity of the one or more first users during the first period of time (associated with the first plurality of content events). For example, the one or more first users may be identified as having an interest in the first entity based upon the plurality of user profiles, and, in response to identifying the one or more first users, the first plurality of content events may be evaluated (e.g., by analyzing the first plurality of sets of event information) to determine the first user-associated metric.

Other user-associated metrics of the plurality of user-associated metrics may be determined using one or more of the techniques provided herein with respect to determining the first user-associated metric.

Figure 6D:
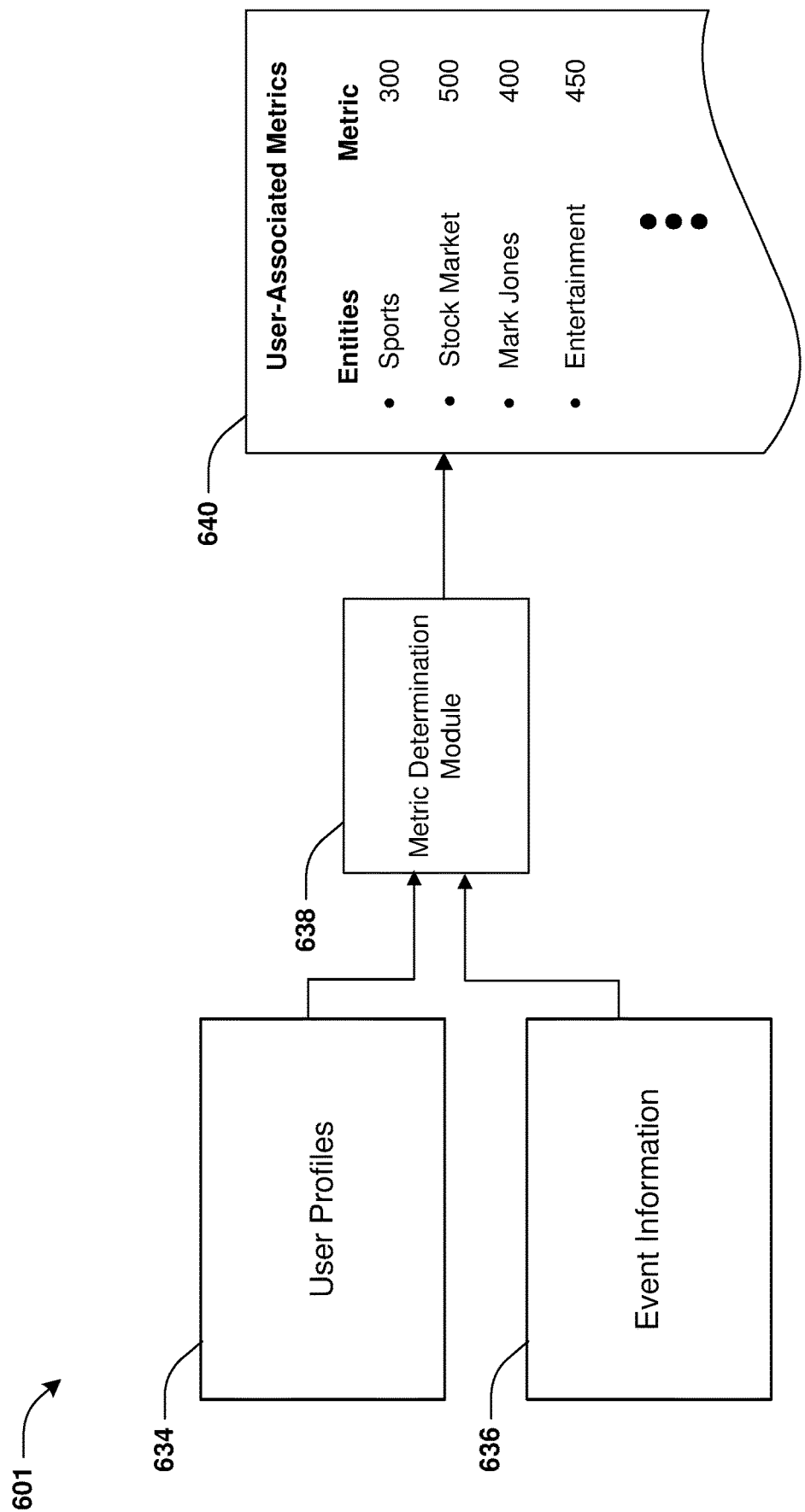
FIG. 6D is a component block diagram illustrating an example system for determining features and/or selecting content based upon the determined features, where user-associated metrics are determined using a metric determination module.

FIG. 6D illustrates determination of the plurality of user-associated metrics (shown with reference number 640). The plurality of user profiles (shown with reference number 634) and/or event information 636 (comprising the first plurality of sets of event information associated with the first plurality of content events and/or the second plurality of sets of event information associated with the second plurality of content events) may be input to a metric determination module 638, which may determine the plurality of user-associated metrics 640. The plurality of user-associated metrics 640 may comprise the first user-associated metric indicating 300 clicks or views having been performed by users having an interest in the first entity (e.g., the topic "Sports"), the second user-associated metric indicating 500 clicks or views having been performed by users having an interest in the third entity (e.g., the topic "Stock Market"), a third user-associated metric indicating 400 clicks or views having been performed by users having an interest in a fourth entity (e.g., the person "Mark Jones"), and/or a fourth user-associated metric indicating 450 clicks or views having been performed by users having an interest in a fifth entity (e.g., the topic "Entertainment").

At 414 (shown in FIG. 4B), the first plurality of vector representations and the second plurality of vector representations are processed using a model to generate a first attention distribution array. The model may comprise a neural network model (e.g., an artificial neural network). For example, the model may comprise a deep learning model (e.g., a deep neural network-based model). In some examples, each value of the first attention distribution array represents, for a user interested in an entity of the first plurality of entities, a proportion (e.g., an inferred proportion) of (i) entity-specific activity, of the user, related to an entity of the second plurality of entities relative to (ii) an entirety of activity of the user. For example, the value may be indicative of a proportion (e.g., an inferred proportion) of (i) a measure of entity-specific content events, of the user, related to the entity of the second plurality of entities relative to (ii) a total measure of content events of the user. In some examples, the model may comprise an attention model and/or the value may correspond to an attention weight determined using the attention model.

In some examples, the first plurality of vector representations associated with the first plurality of entities (e.g., user-level entities determined based upon the plurality of user profiles 634) may be input as queries to the model (e.g., the attention model) and/or the second plurality of vector representations associated with the second plurality of entities (e.g., content-level entities determined based upon the second plurality of content events) may be input as keys to the model. The model may be configured to provide an attention weight (e.g., a value of the first attention distribution array) based upon a query (e.g., a vector representation, of the first plurality of vector representations, associated with a user-level entity) and/or a key (e.g., a vector representation, of the second plurality of vector representations, associated with a content-level entity). The model may process the query and/or the key (e.g., via dot product multiplication) to generate the attention weight to be representative of a level of attention of the query to the key. In some examples, the plurality of user-associated metrics may correspond to values of an attention system, comprising the model, which may use the values (e.g., in conjunction with a combination module 678 shown in FIGS. 6F-6G) to generate an inferred activity distribution array.

Figure 6E:
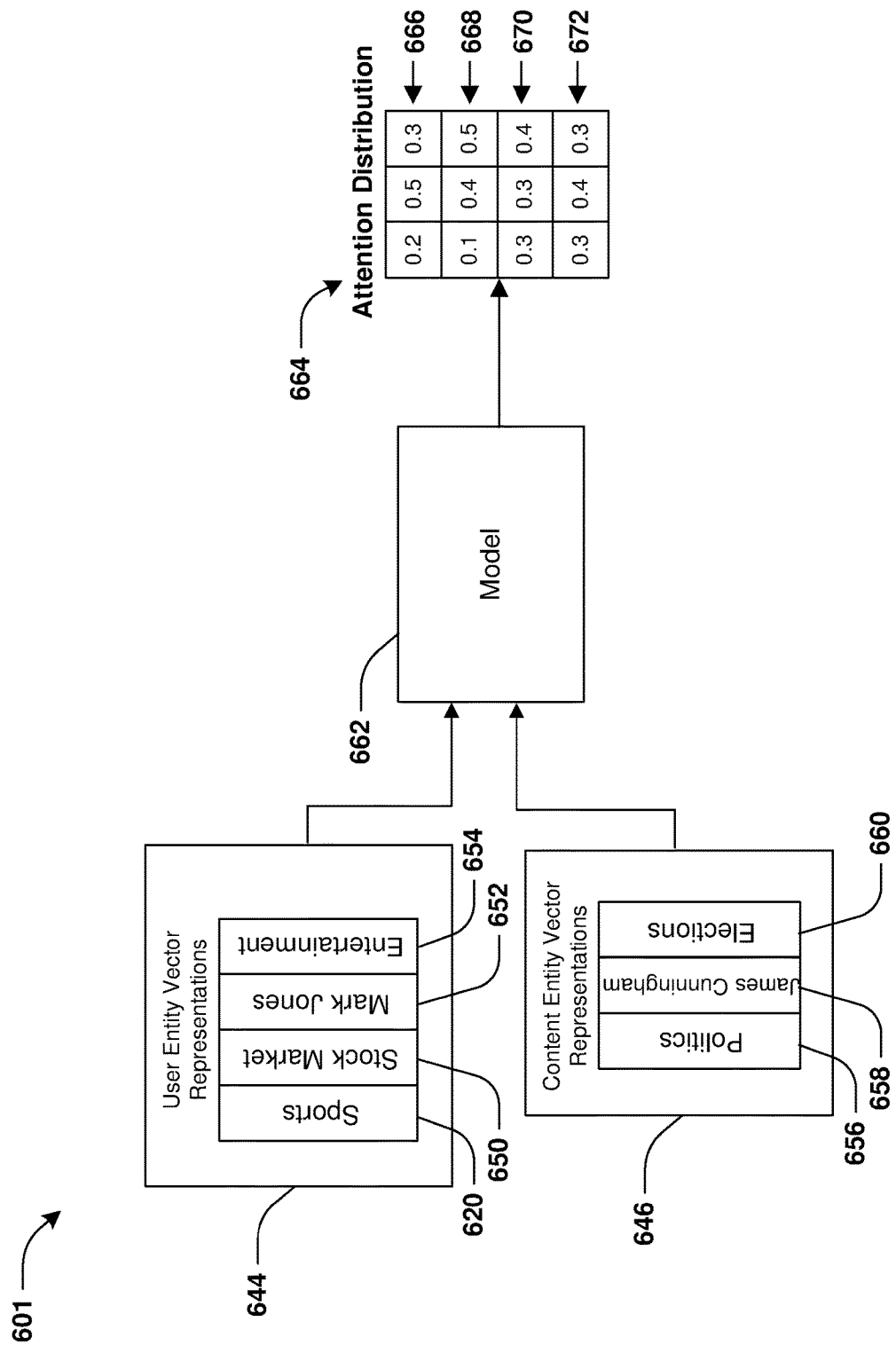
FIG. 6E is a component block diagram illustrating an example system for determining features and/or selecting content based upon the determined features, where an attention distribution array is generated using a model.

FIG. 6E illustrates generation of the first attention distribution array (shown with reference number 664). The first plurality of vector representations (shown with reference number 644) associated with the first plurality of entities (e.g., user-level entities determined based upon the plurality of user profiles 634) and the second plurality of vector representations (shown with reference number 646) associated with the second plurality of entities (e.g., content-level entities determined based upon the second plurality of content events) may be input to the model (shown with reference number 662), which may generate the first attention distribution array 664.

The first plurality of vector representations 644 may comprise the first vector representation 620 associated with the topic "Sports", a vector representation 650 associated with the topic "Stock Market", a vector representation 652 associated with the person "Mark Jones", and/or a vector representation 654 associated with the topic "Entertainment".

The second plurality of vector representations 646 may comprise the second vector representation (shown with reference number 656) associated with the topic "Politics", a vector representation 658 associated with the person "James Cunningham", and/or a vector representation 660 associated with the topic "Elections".

In some examples, the first attention distribution array 664 may comprise a plurality of sets of values (shown as rows in FIG. 6E) associated with the first plurality of entities. Each set of values of the plurality of sets of values may be associated with an entity of the first plurality of entities. For example, the first attention distribution array 664 may comprise a first set of values 666 (e.g., a first row) associated with the topic "Sports", a second set of values 668 (e.g., a second row) associated with the topic "Stock Market", a third set of values 670 (e.g., a third row) associated with the person "Mark Jones", and/or a fourth set of values 672 (e.g., a fourth row) associated with the topic "Entertainment".

The first set of values 666 may be indicative of an inferred distribution of attention of a user having an interest in the topic "Sports" across entities of the second plurality of entities. In an example, a first value "0.2" of the first set of values 666 may correspond to a proportion (e.g., an inferred proportion) of (i) a measure of entity-specific content events, of the user, related to the topic "Politics" of the second plurality of entities relative to (ii) a total measure of content events of the user. A second value "0.5" of the first set of values 666 may correspond to a proportion (e.g., an inferred proportion) of (i) a measure of entity-specific content events, of the user, related to the person "James Cunningham" of the second plurality of entities relative to (ii) the total measure of content events of the user. A third value "0.3" of the first set of values 666 may correspond to a proportion (e.g., an inferred proportion) of (i) a measure of entity-specific content events, of the user, related to the topic "Elections" of the second plurality of entities relative to (ii) the total measure of content events of the user. Accordingly, the first set of values 666 may indicate that (i) 20% of total content events, of a user having an interest in the topic "Sports", may be related to the topic "Politics", (ii) 50% of the total content events, of the user having an interest in the topic "Sports", may be related to the person "James Cunningham", and/or (iii) 30% of the total content events, of the user having an interest in the topic "Sports", may be related to the topic "Elections". In an example in which the content events correspond to presentation events of news articles, the first set of values 666 may indicate that among news articles that are presented to a user having an interest in the topic "Sports", (i) 20% of the news articles may be related to the topic "Politics", (ii) 50% of the news articles may be related to the person "James Cunningham", and/or (iii) 30% of the news articles may be related to the topic "Elections". In an example in which the content events correspond to selection events of news articles, the first set of values 666 may indicate that among news articles that are selected by a user having an interest in the topic "Sports", (i) 20% of the news articles may be related to the topic "Politics", (ii) 50% of the news articles may be related to the person "James Cunningham", and/or (iii) 30% of the news articles may be related to the topic "Elections". Other sets of values (other than the first set of values 666) of the first attention distribution array 664 may similarly correspond to inferred distributions of attention of users having interests in corresponding entities (e.g., the topic "Stock Market", the person "Mark Jones, the topic "Entertainment") across entities of the second plurality of entities.

In some examples, the model 662 (e.g., the neural network model) may plot the first plurality of vector representations 644 and/or the second plurality of vector representations 646 in a vector space. In an example, the vector space may be a low-dimensional space (e.g., a two-dimensional space or a three-dimensional space). In some examples, values of the first attention distribution array 664 may be determined by comparing (e.g., in the vector space) the first plurality of vector representations 644 with the second plurality of vector representations 646, respectively. For example, the first set of values 666 (associated with the topic "Sports") may be determined based upon the first vector representation 620 (associated with the topic "Sports") and the second plurality of vector representations 646, the second set of values 668 (associated with the topic "Stock Market") may be determined based upon the vector representation 650 (associated with the topic "Stock Market") and the second plurality of vector representations 646, the third set of values 670 (associated with the person "Mark Jones") may be determined based upon the vector representation 652 (associated with the person "Mark Jones") and the second plurality of vector representations 646, and/or the fourth set of values 672 (associated with the topic "Entertainment") may be determined based upon the vector representation 654 (associated with the topic "Entertainment") and the second plurality of vector representations 646.

Alternatively and/or additionally, the model 662 (e.g., the neural network model) may determine a plurality of similarity scores based upon the first plurality of vector representations 644 and/or the second plurality of vector representations 646, and/or may use the plurality of similarity scores to determine the values of the first attention distribution array 664. Each similarity score of the plurality of similarity scores may correspond to a level of similarity between a vector representation of the first plurality of vector representations 644 and a vector representation of the second plurality of vector representations 646. In an example, determining the first set of values 666 may comprise (i) determining a first similarity score based upon the first vector representation 620 associated with the topic "Sports" and the second vector representation 656 associated with the topic "Politics", and/or determining the value "0.2" (associated with the topic "Sports" and the topic "Politics") based upon the first similarity score, (ii) determining a second similarity score based upon the first vector representation 620 associated with the topic "Sports" and the vector representation 658 associated with the person "James Cunningham", and/or determining the value "0.5" (associated with the topic "Sports" and the person "James Cunningham") based upon the second similarity score, and/or (iii) determining a third similarity score based upon the first vector representation 620 associated with the topic "Sports" and the vector representation 660 associated with the topic "Elections", and/or determining the value "0.3" (associated with the topic "Sports" and the topic "Elections") based upon the third similarity score. In some examples, the first similarity score, the second similarity score and/or the third similarity score may be normalized to determine the first set of values 666 (e.g., such that the first set of values 666 have a sum equal to 1 or other value).

In an example, one or more operations (e.g., mathematical operations) may be performed using the first vector representation 620 associated with the topic "Sports" and the second vector representation 656 associated with the topic "Politics" to determine the first similarity score (e.g., the first similarity score may be based upon (and/or may be equal to) a measure of similarity between the first vector representation 620 and the second vector representation 656, such as a cosine similarity between the first vector representation 620 and the second vector representation 656). Other similarity scores of the plurality of similarity scores (other than the first similarity score) may be determined using one or more of the techniques provided herein with respect to determining the first similarity score.

At 416 (shown in FIG. 4B), a first inferred activity distribution array may be generated by applying the plurality of user-associated metrics 640 to the first attention distribution array 664. In some examples, each value of the first inferred activity distribution array represents, for a user interested in an entity of the first plurality of entities, an inferred measure of entity-specific content events, of the user, related to an entity of the second plurality of entities. For example, values of the first inferred activity distribution array may correspond to inferred user cross content feedback features representative of relationships between activity associated with user-level entities and activity associated with content-level entities.

Figure 6F:
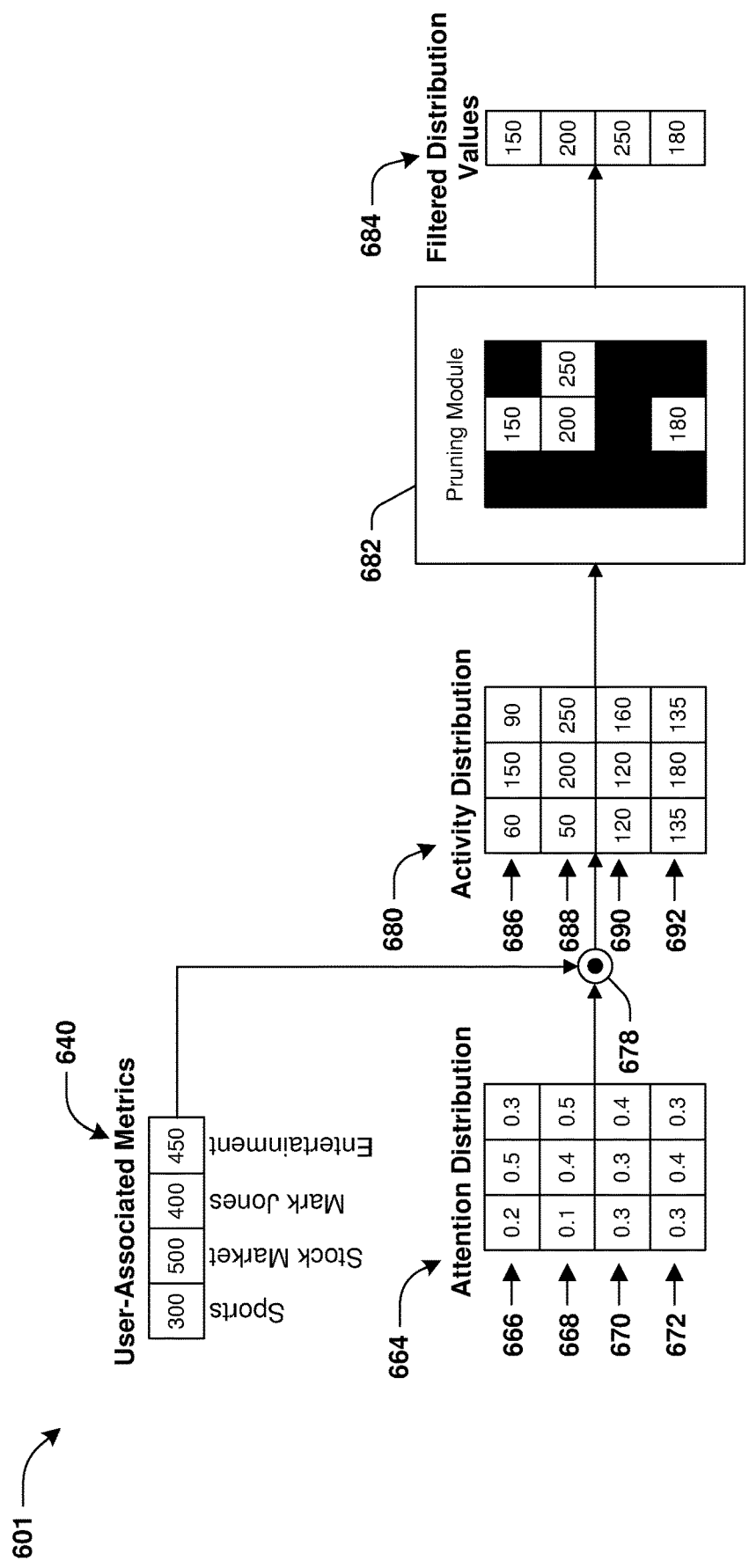
FIG. 6F is a component block diagram illustrating an example system for determining features and/or selecting content based upon the determined features, where user-associated metrics are applied to an attention distribution array to generate an activity distribution array, and values of the activity distribution array are pruned to generate a filtered subset of activity distribution values.

FIG. 6F illustrates generation of the first inferred activity distribution array (shown with reference number 680). A combination module 678 may be used to combine user-associated metrics of the plurality of user-associated metrics 640 with corresponding attention distribution values of the first attention distribution array 664, respectively, to generate the first inferred activity distribution array 680. For example, the combination module 678 may multiply a user-associated metric of the plurality of user-associated metrics 640 with a corresponding attention distribution value of the first attention distribution array 664 to determine a value of the first inferred activity distribution array 680.

In some examples, the first inferred activity distribution array 680 may comprise a second plurality of sets of values (shown as rows in FIG. 6F) associated with the first plurality of entities. Each set of values of the second plurality of sets of values may be associated with an entity of the first plurality of entities. For example, the first inferred activity distribution array 680 may comprise a fifth set of values 686 (e.g., a first row) associated with the topic "Sports", a sixth set of values 688 (e.g., a second row) associated with the topic "Stock Market", a seventh set of values 690 (e.g., a third row) associated with the person "Mark Jones", and/or an eighth set of values 692 (e.g., a fourth row) associated with the topic "Entertainment".

In some examples, the combination module 678 may (i) combine (e.g., multiply) the first set of values 666 (associated with the topic "Sports") with the user-associated metric "300" (associated with the topic "Sports"), respectively, to determine the fifth set of values 686, (ii) combine (e.g., multiply) the second set of values 668 (associated with the topic "Stock Market") with the user-associated metric "500" (associated with the topic "Stock Market"), respectively, to determine the sixth set of values 688, (iii) combine (e.g., multiply) the third set of values 670 (associated with the person "Mark Jones") with the user-associated metric "400" (associated with the person "Mark Jones"), respectively, to determine the seventh set of values 690, and/or (iv) combine (e.g., multiply) the fourth set of values 672 (associated with the topic "Entertainment") with the user-associated metric "500" (associated with the topic "Entertainment"), respectively, to determine the eighth set of values 692.

The fifth set of values 686 of the first inferred activity distribution array 680 may be representative of an inferred distribution of user activity (e.g., presentation events or click events) of a user having an interest in the topic "Sports" across entities of the second plurality of entities. In an example, a fourth value "60" of the fifth set of values 686 may correspond to a measure of entity-specific content events, of the user, related to the topic "Politics" of the second plurality of entities (e.g., the fourth value may correspond to a quantity of presentation events or click events, related to the topic "Politics", of the user having an interest in the topic "Sports"). A fifth value "150" of the fifth set of values 686 may correspond to a measure of entity-specific content events, of the user, related to the person "James Cunningham" of the second plurality of entities. A sixth value "90" of the fifth set of values 686 may correspond to a measure of entity-specific content events, of the user, related to the topic "Elections" of the second plurality of entities. Accordingly, the fifth set of values 686 may indicate that a user having an interest in the topic "Sports" may associated with (i) 60 content events (e.g., presentation events or click events) related to the topic "Politics", (ii) 150 content events (e.g., presentation events or click events) related to the person "James Cunningham", and/or (iii) 90 content events (e.g., presentation events or click events) related to the topic "Elections".

At 418 (shown in FIG. 4B), a filtered subset of activity distribution values may be generated based upon the first inferred activity distribution array 680. For example, in FIG. 6F, the first inferred activity distribution array 680 may be input to a pruning module 682, which may prune values (shown as black squares) of the first inferred activity distribution array 680 to generate the filtered subset of activity distribution values (shown with reference number 684). For example, the filtered subset of activity distribution values 684 may include values that are not pruned by the pruning module 682, and/or may not include values that are pruned by the pruning module 682.

In some examples, the pruning module 682 may compare each value of the first inferred activity distribution array 680 with a pruning threshold, and may prune values that do not meet the pruning threshold. Accordingly, the filtered subset of activity distribution values 684 may comprise values that meet (e.g., that are greater than or equal to) the pruning threshold.

Alternatively and/or additionally, the pruning module 682 may prune values from the first inferred activity distribution array 680 based upon a defined quantity of values, k, to be included in the filtered subset of activity distribution values 684. For example, n values may be pruned by the pruning module 682, where n is equal to a difference between (i) a total quantity of values of the first inferred activity distribution array 680 and (ii) the defined quantity of values k. In the example shown in FIG. 6F, the total quantity of values may be 12 and the defined quantity of values k may be four, and thus n may be 12−4=8. In some examples, the pruning module 682 may prune the lowest n values of the first inferred activity distribution array 680. Accordingly, the top k values of the first inferred activity distribution array 680 may be included in the filtered subset of activity distribution values 684.

In some examples, the model 662 (e.g., the neural network model) may comprise a multi-head attention model that is configured to generate a plurality of attention distribution arrays. The plurality of user-associated metrics 640 may be applied to the plurality of attention distribution arrays, respectively, to generate a plurality of inferred activity distribution arrays (comprising the first inferred activity distribution array 680), which may be used to generate the filtered subset of activity distribution values 684.

Figure 6G:
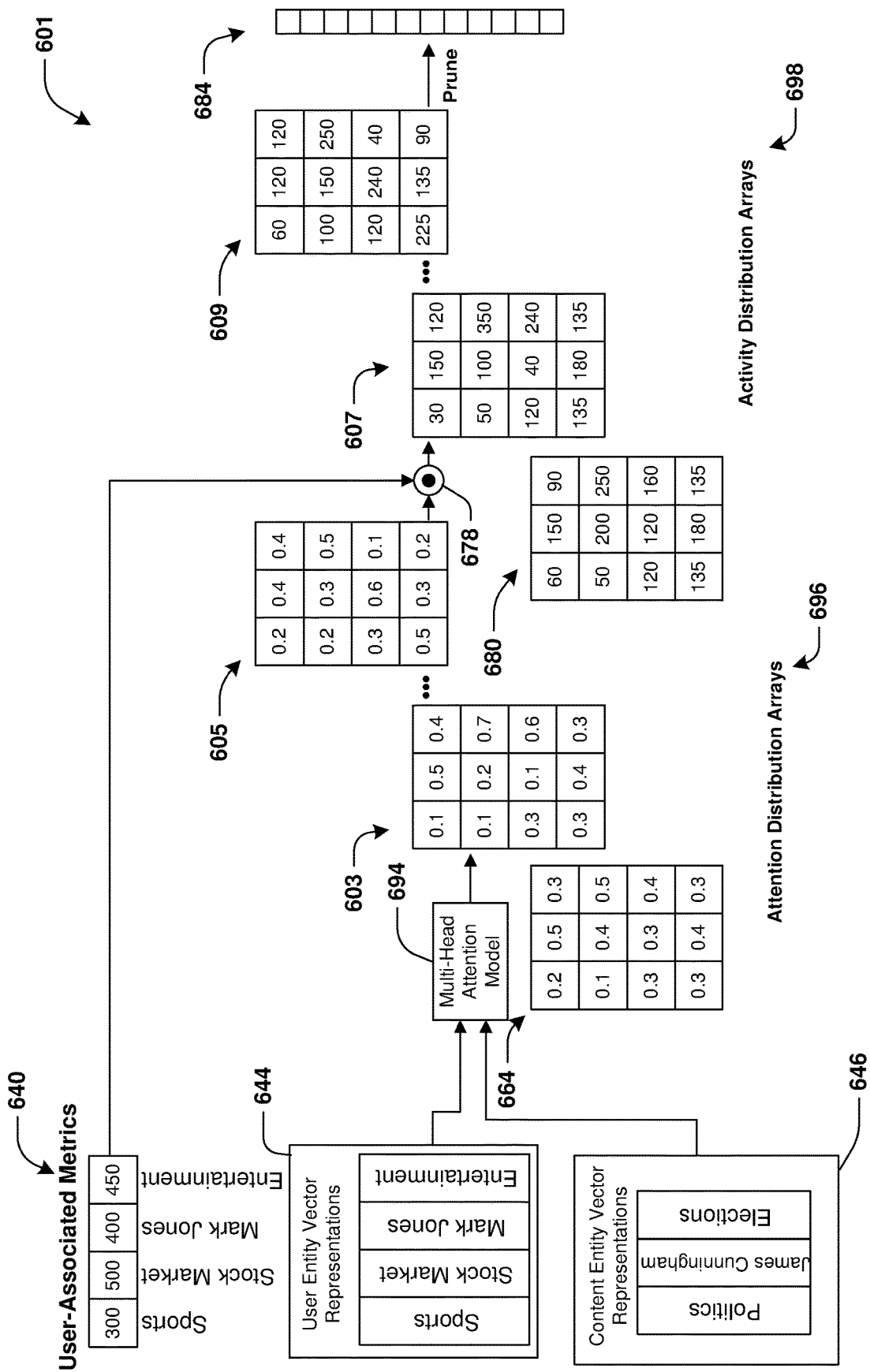
FIG. 6G is a component block diagram illustrating an example system for determining features and/or selecting content based upon the determined features, where a filtered subset of activity distribution values is generated using a multi-head attention model.

FIG. 6G illustrates an example in which the multi-head attention model (shown with reference number 694) is used to generate the plurality of attention distribution arrays (shown with reference number 696). The plurality of attention distribution arrays 696 may comprise the first attention distribution array 664, a second attention distribution array 603 and/or a third attention distribution array 605. The plurality of attention distribution arrays 696 may be generated using a plurality of heads of the multi-head attention model 694. For example, the first attention distribution array 664 may be generated using a first head of the multi-head attention model 694, the second attention distribution array 603 may be generated using a second head of the multi-head attention model 694, and/or the third attention distribution array 605 may be generated using a third head of the multi-head attention model 694. Although FIG. 6G illustrates an implementation in which three heads of the multi-head attention model 694 generates three attention distribution arrays, it may be appreciated that the multi-head attention model 694 may comprise any number of heads and/or the plurality of attention distribution arrays 696 may comprise any number of attention distribution arrays.

In some examples, each head of the plurality of heads of the multi-head attention model 694 may be associated with a (e.g., unique) set of parameters (e.g., a set of one or more trainable parameters) and/or a (e.g., unique) vector sub-space used to generate a corresponding attention distribution array of the plurality of attention distribution arrays 696. For example, the multi-head attention model 694 may (i) generate the first attention distribution array 664 by processing the first plurality of vector representations 644 and/or the second plurality of vector representations 646 using a first set of parameters and/or a first vector sub-space associated with the first head, (ii) generate the second attention distribution array 603 by processing the first plurality of vector representations 644 and/or the second plurality of vector representations 646 using a second set of parameters and/or a second vector sub-space associated with the second head, and/or (iii) generate the third attention distribution array 605 by processing the first plurality of vector representations 644 and/or the second plurality of vector representations 646 using a third set of parameters and/or a third vector sub-space associated with the third head. Accordingly, different arrays of the plurality of attention distribution arrays 696 may be generated using different sets of parameters and/or different vector sub-spaces, and thus, may be reflective of inferences made by the multi-head attention model 694 by looking at (e.g., analyzing) input data (e.g., the first plurality of vector representations 644 and/or the second plurality of vector representations 646) from different perspectives.

In examples, the combination module 678 may combine user-associated metrics of the plurality of user-associated metrics 640 with corresponding attention distribution values of each attention distribution array of the plurality of attention distribution arrays 696 to generate the plurality of inferred activity distribution arrays (shown with reference number 698). The plurality of inferred activity distribution arrays 698 may comprise the first inferred activity distribution array 680 (which may be generated using the plurality of user-associated metrics 640 and the first attention distribution array 664), a second inferred activity distribution array 607 (which may be generated using the plurality of user-associated metrics 640 and the second attention distribution array 603) and/or a third inferred activity distribution array 609 (which may be generated using the plurality of user-associated metrics 640 and the third attention distribution array 605).

In some examples, the filtered subset of activity distribution values 684 may be generated based upon the plurality of inferred activity distribution arrays 698. For example, the pruning module 682 may prune values from the plurality of inferred activity distribution arrays 698 and include remaining values, from the plurality of inferred activity distribution arrays 698, in the filtered subset of activity distribution values 684. For example, values that do not meet the pruning threshold may be pruned by the pruning module 682, and values that do meet the pruning threshold may be included in the filtered subset of activity distribution values 684. Alternatively and/or additionally, for each inferred activity distribution array of the plurality of inferred activity distribution arrays 698, the pruning module 682 may prune n values (e.g., where n is equal to a difference between the total quantity of values of the first inferred activity distribution array 680 and the defined quantity of values k) and include the remaining k values (e.g., top k values of the inferred activity distribution array) in the filtered subset of activity distribution values 684. For example, TopK pooling may be performed to generate the filtered subset of activity distribution values 684. Accordingly, the top k values of each inferred activity distribution array of the plurality of inferred activity distribution arrays 698 may be included in the filtered subset of activity distribution values 684. Thus, in an example in which k=4 and the plurality of inferred activity distribution arrays 698 comprise three inferred activity distribution arrays, the filtered subset of activity distribution values 684 may comprise 12 values (e.g., four values from each of the plurality of inferred activity distribution arrays 698). In an example, a quantity of values included in the filtered subset of activity distribution values 684 may be equal to k×h, where h corresponds to the quantity of heads of the multi-head attention model 694. Embodiments are contemplated in which rather than (or in addition to) using TopK pooling to generate the filtered subset of activity distribution values 684, other pooling techniques (e.g., max pooling, average pooling, etc.) are used to generate the filtered subset of activity distribution values 684.

In some examples, the first plurality of entities and/or the second plurality of entities may be at least a part of an entity set (e.g., a topic set) T, wherein each vector representation of the first plurality of vector representations 644 and/or the second plurality of vector representations 646 may have $d_{model}$ dimensions. An embedding matrix (e.g., a pre-trained embedding matrix) may comprise the first plurality of vector representations 644 and/or the second plurality of vector representations 646. The embedding matrix may correspond to $W_e \in \mathbb{R}^{|T| \times d_{model}}$. A vector representation (e.g., an embedding) of the embedding matrix may correspond to $e_i = \Pi_i \cdot W_e$, wherein $\Pi_i \in \mathbb{R}^{|T|}$ may be a one-hot vector with the i-th dimension being 1.

In some examples, there may be m queries (e.g., m vector representations of the first plurality of vector representations 644) input to the multi-head attention model 694, where the queries may correspond to $Q \in \mathbb{R}^{m \times d_{model}}$. There may be m values (e.g., m user-associated metrics of the plurality of user-associated metrics 640) input to the combination module 678. There may be n keys (e.g., n vector representations of the second plurality of vector representations 646) input to multi-head attention model 694, where the keys may correspond to $K \in \mathbb{R}^{m \times d_{model}}$.

In some examples, $$\text{Attention}(\tilde{Q}, \tilde{K}) = \text{softmax}\left(\frac{\tilde{Q}\tilde{K}^T}{\sqrt{d}}\right),$$

$$\text{MultiHead}(Q, K) = \text{Concat}(\text{head}_1, \ldots, \text{head}_h),$$

and/or $\text{head}_i = \text{Attention}(QW_i^Q, KW_i^K),$ where h may correspond to a quantity of heads of the multi-head attention model 694, where $\text{Attention}(\tilde{Q}, \tilde{K})$ may correspond to an attention weight output by the multi-head attention model 694 (e.g., a value of an attention distribution array of the plurality of attention distribution arrays 696), where MultiHead(Q, K) may correspond to a concatenation of outputs of the plurality of heads of the multi-head attention model 694, and/or where $\text{head}_i$ corresponds to an array (e.g., a matrix) computed using the multi-head attention model 694 (e.g., an attention distribution array of the plurality of attention distribution arrays 696). In some examples, $W_i^Q$ and/or $W_i^K$ (e.g., $W_i^Q, W_i^K \in \mathbb{R}^{d_{model} \times d}$) may be trainable parameters in various heads of the multi-head attention model 694.

At 410, a machine learning model may be trained using the filtered subset of activity distribution values 684 to generate a trained machine learning model. In some examples, the trained machine learning model (e.g., a content recommendation ranking model) may be a profile-processing machine learning model trained to select content for transmission to a user based upon a user profile associated with the user.

The trained machine learning model may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc.

In an example, the filtered subset of activity distribution values 684 may correspond to a set of presentation event distribution values associated with presentation events (e.g., the plurality of user-associated metrics 640 used to generate the filtered subset of activity distribution values 684 may correspond to measures of presentation events). For example, each value of the set of presentation event distribution values may correspond to a measure of presentation events (e.g., views), $v_{ij}$, where i corresponds to an entity of the first plurality of entities (e.g., user-level entities determined based upon the plurality of user profiles 634) and/or j corresponds to an entity of the second plurality of entities (e.g., content-level entities determined based upon the second plurality of content events).

Alternatively and/or additionally, the filtered subset of activity distribution values 684 may correspond to a set of click event distribution values associated with click events (e.g., the plurality of user-associated metrics 640 used to generate the filtered subset of activity distribution values 684 may correspond to measures of click events). For example, each value of the set of click event distribution values may correspond to a measure of click events (e.g., clicks), $c_{ij}$, where i corresponds to an entity of the first plurality of entities (e.g., user-level entities determined based upon the plurality of user profiles 634) and/or j corresponds to an entity of the second plurality of entities (e.g., content-level entities determined based upon the second plurality of content events).

Alternatively and/or additionally, the content system may generate both the set of presentation event distribution values and the set of click event distribution values using the techniques provided herein with respect to generating the filtered subset of activity distribution values 684, (e.g., each of the set of presentation event distribution values and/or the set of click event distribution values may be generated by pruning values from one or more inferred activity distribution arrays). The machine learning model may be trained, using both the set of presentation event distribution values and the set of click event distribution values, to generate the trained machine learning model.

Alternatively and/or additionally, using the set of presentation event distribution values and the set of click event distribution values, the content system may generate a set of click-through-rate (CTR) values (e.g., clicks over views). For example, a CTR value of the set of CTR values may be associated with a user-level entity (of the first plurality of entities) and a content-level entity (of the second plurality of entities). The CTR value may be determined based upon a measure of click events $c_{ij}$, of the set of click event distribution values, and a measure of presentation events v 11, of the set of presentation event distribution values. The measure of click events $c_{ij}$ and the measure of presentation events $v_{ij}$ may be associated with the user-level entity, i, and the content-level entity, j. For a user interested in the user-level entity, the CTR value may correspond to (an inference of) a proportion of (i) content items about the content-level entity that are selected by the user relative to (ii) an entirety of content items about the content-level entity that are presented for the user. In some examples, the machine learning model may be trained, using the set of CTR values, to generate the trained machine learning model.

Alternatively and/or additionally, a set of aggregated features may be generated based upon the set of presentation event distribution values and/or the set of click event distribution values. The set of aggregated features may include (i) a maximum click metric $$\left(e.g., \text{max\_click} = \max_i u_i\left(\sum_j c_{ij}\right)\right),$$

where $u_i$ may be based upon (e.g., equal to) one or more affinity scores, of one or more users, associated with a user-level entity i, (ii) a sum click metric (e.g., sum_click=$\Sigma_i u_i(\Sigma_j c_{ij})$), (iii) a macro sum click metric $$\left(e.g., \text{macro\_sum\_click} = \frac{\sum_i u_i\left(\sum_j c_{ij}\right)}{\sum_i u_i}\right),$$

(iv) a maximum view metric $$\left(e.g., \text{max\_view} = \max_i u_i\left(\sum_j v_{ij}\right)\right),$$

(v) a sum view metric (e.g., sum_view=$\Sigma_i u_i(\Sigma_j v_{ij})$), (vi) a macro sum view metric $$\left(e.g., \text{macro\_sum\_view} = \frac{\sum_i u_i\left(\sum_j v_{ij}\right)}{\sum_i u_i}\right),$$

(vii) a maximum CTR metric $$\left(e.g., \text{max\_ctr} = \max_i u_i \frac{\sum_j c_{ij}}{\sum_j v_{ij}}\right),$$

(viii) a sum CTR metric $$\left(e.g., \text{sum\_ctr} = \sum_i u_i\left(\frac{\sum_j c_{ij}}{\sum_j v_{ij}}\right)\right),$$

(ix) a macro sum CTR metric $$\left(e.g., \text{macro\_sum\_ctr} = \frac{\sum_i u_i\left(\frac{\sum_j c_{ij}}{\sum_j v_{ij}}\right)}{\sum_i u_i}\right),$$

and/or (x) a micro sum CTR metric $$\left(e.g., \text{micro\_sum\_ctr} = \frac{\sum_i u_i\left(\sum_j c_{ij}\right)}{\sum_i u_i\left(\sum_j v_{ij}\right)}\right).$$

In some examples, the machine learning model may be trained, using the set of aggregated features, to generate the trained machine learning model.

Figure 6H:
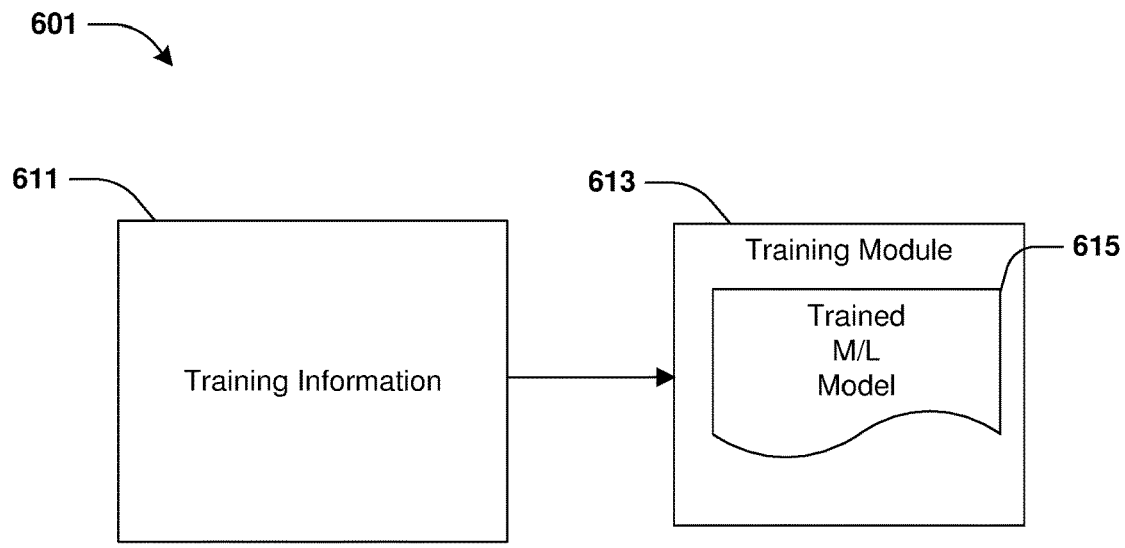
FIG. 6H is a component block diagram illustrating an example system for determining features and/or selecting content based upon the determined features, where a machine learning model is trained, using a training module, to generate a trained machine learning model.

FIG. 6H illustrates the trained machine learning model (shown with reference number 615) being generated using a training module 613. For example, training information 611 may be input to the training module 613, which may use the training information 611 to train the machine learning model and/or generate the trained machine learning model 615. For example, the training module 613 and/or the trained machine learning model 615 may learn (e.g., create, adjust, update, etc.) parameters of the trained machine learning model 615 based upon the training information 611 so that the trained machine learning model 615 can more accurately select content for users. In some examples, the training information 611 comprises the set of presentation event distribution values, the set of click event distribution values, the set of CTR values, the set of aggregated features, and/or other information. Accordingly, the learned parameters may be based upon inferred user cross content feedback features (e.g., relationships between activity associated with user-level entities and activity associated with content-level entities) represented by at least one of the set of presentation event distribution values, the set of click event distribution values, the set of CTR values, the set of aggregated features, etc.

At 422 (shown in FIG. 4B), transmission of content may be controlled using the trained machine learning model 615. For example, the trained machine learning model 615 may be used to select content items for presentation to users. In some examples, one or more content items may be arranged on a display of a client device using the trained machine learning model 615 and/or a user profile of a user. For example, a user profile, indicative of determined information associated with a user, may be input to the trained machine learning model 615, and the trained machine learning model 615 may select a content item for presentation to the user based upon the user profile and/or the learned parameters (e.g., learned based upon the training information 611).

Figure 6I:
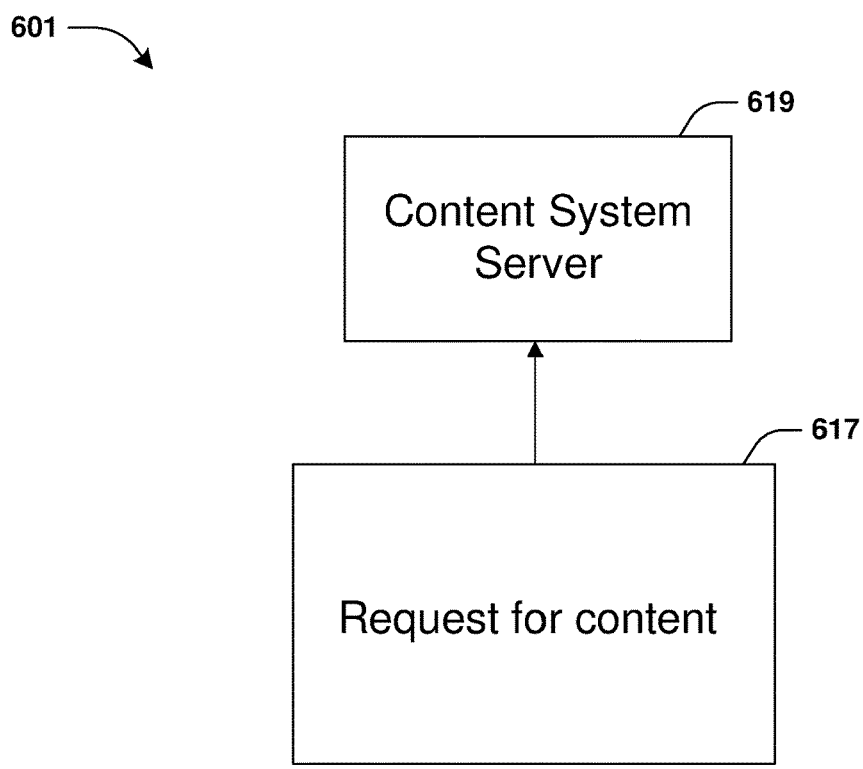
FIG. 6I is a component block diagram illustrating an example system for determining features and/or selecting content based upon the determined features, where a request for content is received.

In some examples, a request for content associated with a second client device may be received. In some examples, the request for content may be associated with a first internet resource (e.g., a web page, an application, a mobile application, etc.). For example, the request for content may be a request to be provided with a content item (e.g., a news article, an informational article, a video, an advertisement, an image, a link, etc.) for presentation via the second client device on the first internet resource. In an example, the request for content may be received by the content system in association with the second client device accessing the first internet resource. The request for content may be transmitted by the second client device or by a server hosting the first internet resource. FIG. 6I illustrates reception of the request for content (shown with reference number 617) by a server 619 of the content system.

In some examples, the request for content may be indicative of client information (e.g., at least one of a device identifier, an IP address, a MAC address, a carrier identifier, a user identifier, a browser cookie, etc.). A third user profile associated with the second client device and/or a user of the second client device may be identified based upon a determination that the client information indicated by the request for content matches client information indicated by the third user profile.

In response to receiving the request for content and/or identifying the third user profile (based upon the request for content), one or more content items may be selected for presentation on the second client device. For example, the trained machine learning model 615 may be used, in conjunction with the third user profile, to select the one or more content items. For example, the trained machine learning model 615 may determine a plurality of content item scores associated with a second plurality of content items (e.g., news articles, informational articles, videos, advertisements, images, links, etc.), and use the plurality of content item scores to select the one or more content items from the plurality of content items. The plurality of content items may be stored in a content item database from which the content system is configured to select content for presentation to users.

The plurality of content item scores may comprise a first content item score associated with a third content item of the second plurality of content items, a second content item score associated with a fourth content item of the second plurality of content items, etc. In an example, the first content item score may be representative of (and/or based upon) at least one of a likelihood that the user of the second client device would have an interest in the third content item, a likelihood that the user would select the third content item if presented to the user, a likelihood that the user would interact with and/or consume (e.g., read an article, watch a video, etc.) the third content item if presented to the user, etc. The first content item score may be determined, using the trained machine learning model 615, based upon the third user profile and/or content information associated with the third content item.

In an example, the third user profile may be indicate that the user of the second client device has an interest in a sixth entity, and the content information associated with the third content item may indicate that the third content item is associated with (e.g., is about) a seventh entity. In an example, the sixth entity may correspond to the person "Mark Jones" and/or the seventh entity may correspond to the topic "Politics". In some examples, the training information 611 (used to train the trained machine learning model 615) may be indicative of a feature (e.g., an inferred user cross content feedback feature) associated with a relationship between activity associated with the person "Mark Jones" (e.g., a user-level entity) and activity associated with the topic "Politics" (e.g., a content-level entity). For example, the feature may comprise a presentation event distribution value (of the set of presentation event distribution values, for example) corresponding to a measure of entity-specific presentation events, of a user interested in the person "Mark Jones", related to the topic "Politics". Alternatively and/or additionally, the feature may comprise a click event distribution value (of the set of click event distribution values, for example) corresponding to a measure of entity-specific click events, of a user interested in the person "Mark Jones", related to the topic "Politics". Accordingly, a higher value of the feature (e.g., a higher value of the presentation event distribution value and/or a higher value of the click event distribution value) may be reflective of a higher likelihood that the user would at least one of be interested in, select, interact with, consume, etc. the third content item about the topic "Politics" if presented to the user. Accordingly, a higher value of the feature may result in a higher value of the first content item score associated with the third content item, such as due, at least in part, to the trained machine learning model 615 (used to determine the first content item score) having been trained using the feature.

Other content item scores of the plurality of content item scores may be determined using one or more of the techniques provided herein with respect to determining the first content item score.

In some examples, one or more content items may be selected, from the second plurality of content items, for presentation via the second client device based upon the plurality of content item scores. In some examples, the one or more content items may be selected from among the second plurality of content items based upon a determination that the one or more content items are associated with highest content item scores of the plurality of content item scores. In an example, the one or more content items may be selected from among the second plurality of content items based upon a determination that the one or more content items are associated with s highest content item scores of the plurality of content item scores (e.g., content items associated with the s highest content item scores of the plurality of content item scores may be included in the one or more content items). In an example where s is 10, 10 content items associated with the 10 highest content item scores of the plurality of content item scores may be selected and/or included in the one or more content items. In an example where s is 1, a single content item associated with the highest content item score of the plurality of content item scores may be selected and/or included in the one or more content items. Alternatively and/or additionally, the second plurality of content items may be ranked based upon the plurality of content item scores (e.g., a content item having a higher content item score is ranked higher than a content item having a lower content item score), and/or the top s ranked content items may be selected from among the second plurality of content items (e.g., the top s ranked content items may be included in the one or more content items). Alternatively and/or additionally, the one or more content items may be selected from among the second plurality of content items based upon a determination that the one or more content items are associated with content item scores (of the plurality of content item scores) that exceed a threshold content item score.

Embodiments are contemplated in which the one or more content items are selected (based upon the filtered subset of activity distribution values 684, the set of presentation event distribution values, the set of click event distribution values, the set of CTR values, the set of aggregated features, and/or other information) without a machine learning model. For example, the plurality of content item scores may be determined, without the trained machine learning model 615, based upon the filtered subset of activity distribution values 684, the set of presentation event distribution values, the set of click event distribution values, the set of CTR values, the set of aggregated features, and/or other information.

In some examples, in response to selecting the one or more content items, the one or more content items may be provided (to the second client device) for presentation via the second client device. For example, the one or more content items may be displayed on a screen of the second client device, where dimensions (e.g., outer dimensions) of the one or more content items may be configured (e.g., sized) based upon at least one of a screen size, an aspect ratio, etc. of the second client device.

Figure 6J:
FIG. 6J is a component block diagram illustrating an example system for determining features and/or selecting content based upon the determined features, where selected content is presented on a client device.

FIG. 6J illustrates presentation of the one or more content items via the second client device (shown with reference number 625). The one or more content items may be presented on the first internet resource (shown with reference number 621), such as a web page for accessing news articles. In the example shown in FIG. 6J, the one or more content items may comprise news items of a list of news items. The news items may comprise a news item 623, a news item 627, a news item 629 and/or a news item 631. In some examples, each news item may be a selectable list item and may be associated with a news article, wherein in response to a selection of the news item (e.g., the selectable list item), the news article may be displayed on the second client device 625.

Embodiments are contemplated in which a plurality of content-associated metrics associated with the second plurality of entities are determined and/or used to generate the filtered subset of activity distribution values 684. For example, the plurality of content-associated metrics may be determined and/or used (for generating the filtered subset of activity distribution values 684) in place of (or in addition to) the plurality of user-associated metrics 640 associated with the first plurality of entities. In some examples, a content-associated metric of the plurality of content-associated metrics may be representative of online activity performed in association with one or more content items, of the plurality of content items, associated with an entity of the second plurality of entities. For example, the plurality of content-associated metrics may comprise (i) a first content-associated metric representative of online activity performed in association with one or more first content items, of the plurality of content items, associated with an eighth entity of the second plurality of entities, a second content-associated metric representative of online activity performed in association with one or more second content items, of the plurality of content items, associated with a ninth entity of the second plurality of entities, etc.

In some examples, the first content-associated metric may be indicative of a measure of events (e.g., presentation events or click events) associated with the one or more first content items that are associated with (e.g., about) the eighth entity. In an example in which the eighth entity is the topic "Elections", the first content-associated metric may correspond to a measure of events in which content items about the topic "Elections" are presented and/or selected by users of the content system. In some examples, content information associated with the plurality of content items may be analyzed based upon the eighth entity to identify the one or more first content items associated with the eighth entity (e.g., content items that are determined to be about the eighth entity). For example, the one or more first content items may be identified based upon a determination that, for each content item of the one or more first content items, a corresponding set of content information comprises an indication that the content item is associated with (e.g., about) the eighth entity. The second plurality of content events may be evaluated (e.g., by analyzing the second plurality of sets of event information) to identify a set of content events, in the second plurality of content events, that are associated with presentation or selection of the one or more first content items. The first content-associated metric may comprise a quantity of events (e.g., a quantity of presentation events or a quantity of click events) of the set of content events. Alternatively and/or additionally, the first content-associated metric may comprise a rate at which the set of content events (e.g., a quantity of events per unit of time).

In some examples, the model 662 (e.g., an attention model, such as the multi-head attention model 694) may process the first plurality of vector representations 644 and the second plurality of vector representations 646 to generate one or more attention distribution arrays (e.g., the first attention distribution array 664 and/or the plurality of attention distribution arrays 696). Each value of the one or more attention distribution arrays may correspond to an attention weight. Each value of the one or more attention distribution arrays may represent, for a content item associated with an entity of the second plurality of entities, a proportion of (i) activity performed in association with the content item by one or more users having an interest in an entity of the first entities relative to (ii) an entirety of activity performed in association with the content item.

In an example, a value of the one or more attention distribution arrays may be associated with the ninth entity of the second plurality of entities (e.g., content-level entities) and a tenth entity of the first plurality of entities (e.g., user-level entities). For example, the ninth entity may correspond to a topic "Cars" and/or the tenth entity may correspond to a topic "Basketball". The value may correspond to a proportion (e.g., an inferred proportion) of (i) a measure of content events, of users that are determined to have an interest in the topic "Basketball", performed in association with a content item about the topic "Cars" relative to (ii) a total measure of content events performed in association with the content item about the topic "Cars". In an example in which the value is "0.2", the value may indicate that 20% of total content events associated with the content item are performed by users that are determined to have an interest in the topic "Basketball". That is, among content events in which a content item about the topic "Cars" is presented and/or selected, 20% of the content events are performed by users that are determined to have an interest in the topic "Basketball".

In an example in which the plurality of content-associated metrics are determined and/or used to generate the filtered subset of activity distribution values 684, the first plurality of vector representations 644 associated with the first plurality of entities (e.g., user-level entities determined based upon the plurality of user profiles 634) may be input as keys (instead of queries, for example) to the model 662 (e.g., the attention model) and/or the second plurality of vector representations 646 associated with the second plurality of entities (e.g., content-level entities determined based upon the second plurality of content events) may be input as queries (instead of keys, for example) to the model 662. The model 662 may be configured to provide an attention weight (e.g., a value of the one or more attention distribution arrays) based upon a query (e.g., a vector representation, of the second plurality of vector representations 646, associated with a content-level entity) and/or a key (e.g., a vector representation, of the first plurality of vector representations 644, associated with a user-level entity). The model may process the query and/or the key (e.g., via dot product multiplication) to generate the attention weight to be representative of a level of attention of the query to the key. In some examples, the plurality of content-associated metrics may correspond to values of an attention system, comprising the model 662, which may use the values (e.g., in conjunction with the combination module 678 shown in FIGS. 6F-6G) to generate one or more inferred activity distribution arrays (e.g., the first inferred activity distribution array 680 and/or the plurality of inferred activity distribution arrays 698). The one or more inferred activity distribution arrays may be used to generate the filtered subset of activity distribution values 684 (and/or the set of presentation event distribution values, the set of click event distribution values, the set of CTR values and/or the set of aggregated features) using one or more of the techniques shown in and/or described with respect to FIGS. 6E-6G and/or the method 400 of FIGS. 4A-4B.

Embodiments are contemplated in which the trained machine learning model 615 is used for performing one or more other functions other than content selection, such as fraud detection, email filtering, medical tasks, etc.

Embodiments are contemplated in which the first plurality of entities do not correspond to user interests, and may correspond to other user-related features, such as at least one of demographic features (e.g., at least one of age, gender, etc.), search history features (e.g., previous search queries), location features (e.g., at least one of a region, state, city, country, etc. of a user), etc.

Embodiments are contemplated in which the second plurality of entities do not correspond to entities that content items are about, and may correspond to other content-related features, such as at least one of creators, publishers and/or authors associated with content items, brands, advertisers and/or companies associated with content items, formats of content items (e.g., whether a content item is audio, video or an image), content item durations and/or sizes, etc.

Figure 7:
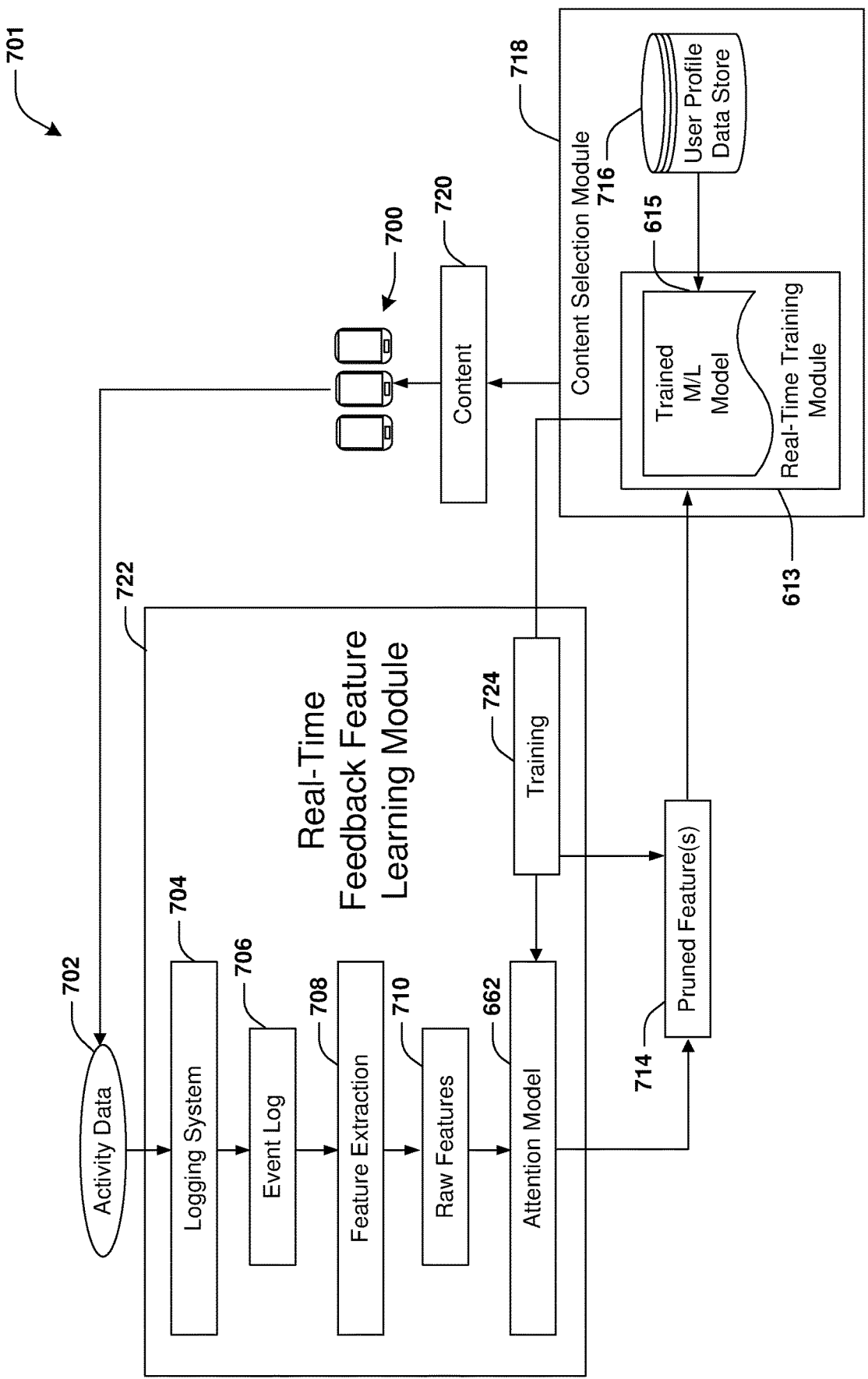
FIG. 7 is a component block diagram illustrating an example system for determining features and/or selecting content based upon the determined features.

FIG. 7 illustrates a system 701 for learning features and/or selecting content for transmission to devices based upon the features, described with respect to the method 400 of FIGS. 4A-4B and/or the system 601 of FIGS. 6A-6J. In some examples, user activity data 702 may be received by a feedback feature learning module 722. The feedback feature learning module 722 may correspond to a real-time (e.g., near real-time and/or low latency) feedback feature learning module that is configured to determine features 714 associated with recent user activity (e.g., user activity during the second period of time, such as the last five minutes or other duration of time) and provide the features 714 to a content selection module 718. The content selection module 718 may be a display control module that controls the display of content on client devices. The user activity data 702 may be determined based upon (and/or carried by) signals from client devices 700 of users of the content system. A logging system 704 may process the user activity data 702 to identify content events (e.g., the second plurality of content events associated with the second period of time) and/or may log the content events in an event log 706. For example, the event log 706 may be indicative of the second plurality of sets of event information indicative of the second plurality of content events. The event log 706 may be input to a feature extraction module 708, which may use the event log 706 generate raw features 710 (e.g., a set of raw feedback features) indicative of the plurality of user-associated metrics and/or the plurality of content-associated metrics. The raw features 710 may be provided to the model 662 (e.g., the attention model, such as the multi-head attention model 694), which may use the raw features 710 (in conjunction with the first plurality of vector representations 644 associated with the first plurality of entities and/or the second plurality of vector representations 646 associated with the second plurality of entities) to generate a set of features 714 (e.g., pruned features). The set of features 714 may comprise the filtered subset of activity distribution values 684, the set of presentation event distribution values, the set of click event distribution values, the set of CTR values and/or the set of aggregated features.

The set of features 714 may be used, by the content selection module 718, to select content for transmission to client devices. For examples, the set of features 714 may be input to the training module 613 (e.g., a real-time training module) which may train (e.g., train in real time) a machine learning model to generate the trained machine learning model 615. In some examples, training the machine learning model and/or generating the trained machine learning model 615 may comprise updating trainable parameters of the machine learning model, using the set of features 714, to generate the trained machine learning model 615 (e.g., an updated version of the machine learning model).

Alternatively and/or additionally, the training module 613 may train 724 (e.g., train in real time) the model 662 (e.g., the attention model, such as the multi-head attention model 694) and/or the set of features 714 (e.g., pruned features). For example, the training module 613 may train 724 the model 662 (e.g., a machine learning model) and/or the set of features 714 using (i) determined sets of features (e.g., sets of pruned features previously determined using the model 662), (ii) feedback received from client devices (e.g., client devices 700) in response to displaying content on client devices that were selected using the (e.g., previously) determined sets of features, and/or (iii) an optimization function that is used to update (e.g., modify and/or adjust based upon the determined sets of features and/or the feedback) trainable parameters of the model 662 to improve (e.g., optimize) performance of the model 662 (e.g., generate more accurate and/or useful sets of features, such as pruned features that are used to more accurately select and display content of interest to a user of the content system). Embodiments are contemplated in which the model 662 and the trained machine learning model 615 are implemented (e.g., used and/or trained) in a single machine model system and/or a single machine learning model. In some examples, the training module 613 may train 724 (e.g., train in real time) the model 662 and/or the second set of features 714 in conjunction with (e.g., concurrently with) training the trained machine learning model 615 (which may be used to select content for transmission to client devices and/or control the display of content on client devices).

In some examples, in response to receiving a request for content, the content selection module 718 may retrieve, from the user profile data store (shown with reference number 716), a user profile of a user associated with the request, and may use the trained machine learning model 615 to select a content item to present to the user based upon the retrieved user profile. Accordingly, the selected content item may be presented on a device of the client devices 700, and the logging system 704 may log feedback associated with the presentation of the content item (e.g., the feedback may comprise an indication that the content item was at least one of viewed, selected, interacted with, etc. by the user) in the event log 706, which may be then be used to further train the trained machine learning model 615 to update trainable parameters and/or improve an accuracy of the trained machine learning model 615. In this way, the system 701 implements a closed-loop process allowing usage of feedback to tailor and/or continuously and/or periodically update the trained machine learning model 615 (and/or the model 662) used to provide content to users, thereby improving (e.g., continuously and/or periodically improving over time) a quality and/or accuracy of selection and/or presentation of content items for a device. Closed-loop control may reduce errors and produce more efficient operation of a computer system which implements the trained machine learning model 615 (and/or the model 662) and/or selects and/or presents content items. The reduction of errors and/or the efficient operation of the computer system may improve operational stability and/or predictability of operation. Accordingly, using processing circuitry to implement closed loop control described herein may improve operation of underlying hardware of the computer system.

Alternatively and/or additionally, implementation of at least some of the disclosed subject matter may lead to benefits including, but not limited to, improved performance of a computer configured to select content and/or faster selections of content (e.g., as a result of providing for a reduced amount of computations needed to select content using the set of features 714, such as due to values having been pruned to determine the set of features 714, which reduces an amount of data that needs to be processed in order to select the content and/or in order perform machine learning model training to generate the trained machine learning model 615 used to select the content).

Alternatively and/or additionally, implementation of the disclosed subject matter may lead to benefits including faster training times for training (e.g., periodically retraining and/or updating) the trained machine learning model 615 and/or faster storage times for storing the trained machine learning model 615 onto servers. Accordingly, machine learning models may be updated, loaded onto a server, and/or used to select content more quickly. Thus an updated machine learning model may be available for selecting content more quickly, thereby reducing delay that may be introduced into the system as a result of loading the updated machine learning model onto the server and/or thereby enabling the system to start using the updated machine learning model to select content at an earlier time.

Alternatively and/or additionally, implementation of the disclosed subject matter may lead to benefits including more accurate selections of content (e.g., as a result of the trained machine learning model 615 being updated more quickly based upon real-time data (e.g., near real-time data), while still meeting any storage requirements and/or memory limitations, such that the trained machine learning model 615 can select content based upon more current activity data and/or such that the content selection module 718 is kept in an updated state and/or does not rely upon old information and/or an outdated machine learning model to select content).

Alternatively and/or additionally, implementation of at least some of the disclosed subject matter may lead to a more accurate and/or appropriate selection of a content item for presentation via a client device that has a higher probability of resulting in the content item being selected and/or a higher probability of a user consuming the content item to have an interest in the content item (e.g., as a result of the more accurate selections of content, etc.).

Alternatively and/or additionally, implementation of at least some of the disclosed subject matter may lead to benefits including a reduction in screen space and/or an improved usability of a display (e.g., of the client device) (e.g., as a result of the higher probability of the user consuming the content item to have an interest in the content item, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosure subject matter may lead to benefits including less manual effort needed to be performed to update machine learning models (e.g., as a result of automatically determining the set of features 714 for use in training machine learning models, as compared to features being manually handcrafted for use by the machine learning models, which may require a significant amount of time and/or effort).

Alternatively and/or additionally, implementation of at least some of the disclosed subject matter may lead to benefits including an increase in generalized revenue for presenting content items via client devices (e.g., as a result of the more accurate selections of content, which may result in more interest in content items being presented, thereby resulting in increased advertising revenue, etc.).

In some examples, at least some of the disclosed subject matter may be implemented on a client device, and in some examples, at least some of the disclosed subject matter may be implemented on a server (e.g., hosting a service accessible via a network, such as the Internet).

In some examples, one, some and/or all instances of the term "internet resource" may be replaced with "network resource", which may refer to a resource that is accessed over a network (e.g., private network, public network, the Internet, etc.).

Figure 8:
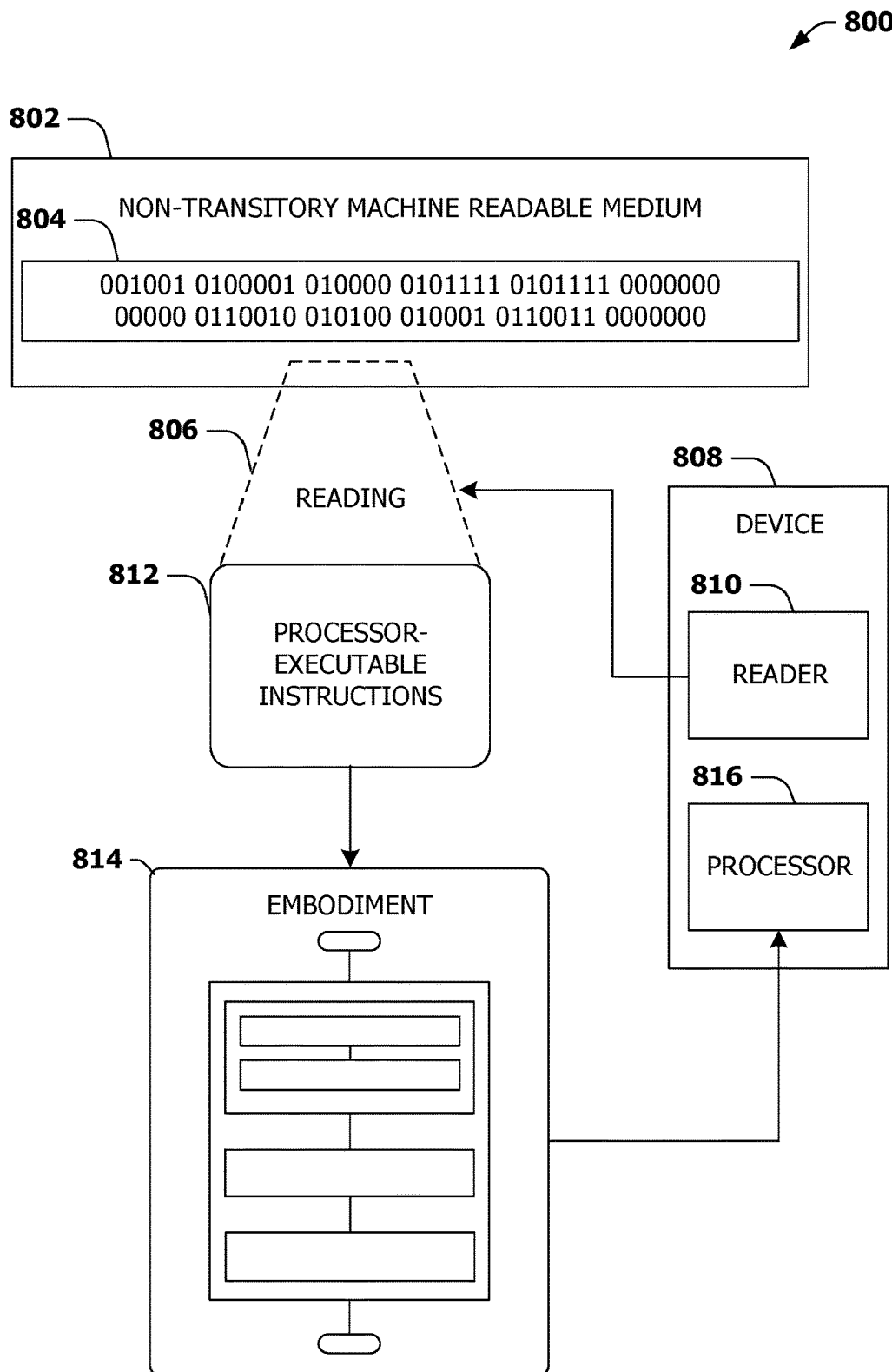
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIGS. 4A-4B, for example. In some embodiments, the processor-executable instructions 812 are configured to cause implementation of a system, such as at least some of the example system 501 of FIGS. 5A-5D, the example system 601 of FIGS. 6A-6J and/or the example system 701 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   monitoring user activity, of a plurality of users, across a plurality of internet resources;
   identifying, in the user activity, a first plurality of content events;
   generating, based upon the first plurality of content events, a plurality of user profiles associated with the plurality of users, wherein each user profile is indicative of an entity in which a user, of the plurality of users, has an interest;
   extracting first entities from the plurality of user profiles;
   retrieving, from one or more first remote devices, supplemental information for each of the first entities;
   generating first vector representations of the first entities using the supplemental information for each of the first entities, wherein each of the first vector representations is generated based upon supplemental information associated with a corresponding entity of the first entities;
   evaluating a second plurality of content events to identify a plurality of content items;
   extracting second entities from content information associated with the plurality of content items;
   retrieving, from one or more second remote devices, supplemental information for each of the second entities;
   generating second vector representations of the second entities using the supplemental information for each of the second entities, wherein each of the second vector representations is generated based upon supplemental information associated with a corresponding entity of the second entities;
determining, based upon at least one of the plurality of user profiles or the second plurality of content events, a plurality of user-associated metrics associated with the first entities, wherein:
 a first user-associated metric is representative of online activity of one or more first users having an interest in a first entity of the first entities; and
 a second user-associated metric is representative of online activity of one or more second users having an interest in a second entity of the first entities;
processing, using a neural network model, the first vector representations and the second vector representations to generate an attention distribution array, wherein each value of the attention distribution array represents, for a user interested in an entity of the first entities, a proportion of (i) entity-specific activity, of the user, related to an entity of the second entities relative to (ii) an entirety of activity of the user;
generating an inferred activity distribution array by applying the plurality of user-associated metrics to the attention distribution array;
generating a filtered subset of activity distribution values by pruning values from the inferred activity distribution array;
training a profile-processing machine learning model using the filtered subset of activity distribution values to generate a trained profile-processing machine learning model; and
controlling transmission of content using the trained profile-processing machine learning model.

2. The method of claim 1, wherein controlling the transmission of content comprises:
 receiving a request for content associated with a client device associated with a user profile of the plurality of user profiles;
 in response to receiving the request for content, determining, using the user profile and the trained profile-processing machine learning model, a plurality of content item scores associated with a second plurality of content items;
 selecting, based upon the plurality of content item scores, a first content item of the second plurality of content items; and
 providing the first content item for presentation via the client device.

3. The method of claim 1, wherein generating the filtered subset of activity distribution values comprises:
 comparing each value of the inferred activity distribution array with a threshold; and
 pruning the values in response to determining that the values do not meet the threshold.

4. The method of claim 1, wherein generating the filtered subset of activity distribution values comprises:
 pruning the values in response to determining that the values are n lowest values of the inferred activity distribution array, wherein n is equal to a difference between a total quantity of values of the inferred activity distribution array and a defined quantity of values to be included in the filtered subset of activity distribution values.

5. The method of claim 1, wherein the first plurality of content events comprises at least one of:
 a presentation event associated with presentation of a first content item; or
 a click event associated with selection of a second content item.

6. The method of claim 1, wherein:
 the first user-associated metric is indicative of a measure of presentation events of the one or more first users; and
 the second user-associated metric is indicative of a measure of presentation events of the one or more second users.

7. The method of claim 6, wherein:
 each value of the attention distribution array represents an inferred measure of presentation events, of a user interested in an entity of the first entities, related to an entity of the second entities.

8. The method of claim 1, wherein:
 the first user-associated metric is indicative of a measure of click events of the one or more first users; and
 the second user-associated metric is indicative of a measure of click events of the one or more second users.

9. The method of claim 8, wherein:
 each value of the attention distribution array represents an inferred measure of click events, of a user interested in an entity of the first entities, related to an entity of the second entities.

10. The method of claim 1, wherein:
 the neural network model comprises a multi-head attention model associated with a first head and a second head; and
 processing the first vector representations and the second vector representations to generate the attention distribution array is performed using the first head of the multi-head attention model.

11. The method of claim 10, comprising:
 processing, using the second head of the multi-head attention model, the first vector representations and the second vector representations to generate a second attention distribution array; and
 generating a second inferred activity distribution array by applying the plurality of user-associated metrics to the second attention distribution array,
 wherein generating the filtered subset of activity distribution values comprises pruning values from the second inferred activity distribution array and including remaining values, from the second inferred activity distribution array, in the filtered subset of activity distribution values.

12. The method of claim 11, wherein:
 processing the first vector representations and the second vector representations to generate the attention distribution array is performed based upon at least one of:
  one or more first parameters of the first head of the multi-head attention model; or
  a first vector sub-space associated with the first head of the multi-head attention model; and
 processing the first vector representations and the second vector representations to generate the second attention distribution array is performed based upon at least one of:
  one or more second parameters of the second head of the multi-head attention model; or
  a second vector sub-space associated with the second head of the multi-head attention model.

13. A computing device comprising:
a processor; and
memory comprising processor-executable instructions that when executed by the processor cause performance of operations, the operations comprising:
   extracting first entities from a plurality of user profiles associated with a plurality of users, wherein each user profile is indicative of an entity in which a user, of the plurality of users, has an interest;
   generating first vector representations of the first entities;
   evaluating a plurality of content events to identify a plurality of content items;
   extracting second entities from content information associated with the plurality of content items;
   generating second vector representations of the second entities;
   determining, based upon at least one of the plurality of user profiles or the plurality of content events, a plurality of user-associated metrics associated with the first entities, wherein:
      a first user-associated metric is representative of online activity of one or more first users having an interest in a first entity of the first entities; and
      a second user-associated metric is representative of online activity of one or more second users having an interest in a second entity of the first entities;
   processing, using a model, the first vector representations and the second vector representations to generate an attention distribution array, wherein each value of the attention distribution array represents, for a user interested in an entity of the first entities, a proportion of (i) entity-specific activity, of the user, related to an entity of the second entities relative to (ii) an entirety of activity of the user;
   generating an inferred activity distribution array by applying the plurality of user-associated metrics to the attention distribution array;
   generating a filtered subset of activity distribution values by pruning values from the inferred activity distribution array;
   training a machine learning model using the filtered subset of activity distribution values to generate a trained machine learning model; and
   controlling transmission of content using the trained machine learning model.

14. The computing device of claim 13, wherein controlling the transmission of content comprises:
   receiving a request for content associated with a client device associated with a user profile of the plurality of user profiles;
   in response to receiving the request for content, determining, using the user profile and the trained machine learning model, a plurality of content item scores associated with a second plurality of content items;
   selecting, based upon the plurality of content item scores, a first content item of the second plurality of content items; and
   providing the first content item for presentation via the client device.

15. The computing device of claim 13, wherein:
the model comprises a multi-head attention model associated with a first head and a second head; and
processing the first vector representations and the second vector representations to generate the attention distribution array is performed using the first head of the multi-head attention model.

16. The computing device of claim 15, the operations comprising:
   processing, using the second head of the multi-head attention model, the first vector representations and the second vector representations to generate a second attention distribution array; and
   generating a second inferred activity distribution array by applying the plurality of user-associated metrics to the second attention distribution array,
   wherein generating the filtered subset of activity distribution values comprises pruning values from the second inferred activity distribution array and including remaining values, from the second inferred activity distribution array, in the filtered subset of activity distribution values.

17. The computing device of claim 16, wherein:
processing the first vector representations and the second vector representations to generate the attention distribution array is performed based upon at least one of:
   one or more first parameters of the first head of the multi-head attention model; or
   a first vector sub-space associated with the first head of the multi-head attention model; and
processing the first vector representations and the second vector representations to generate the second attention distribution array is performed based upon at least one of:
   one or more second parameters of the second head of the multi-head attention model; or
   a second vector sub-space associated with the second head of the multi-head attention model.

18. A non-transitory machine readable medium having stored thereon processor-executable instructions that when executed cause performance of operations, the operations comprising:
   extracting first entities from a plurality of user profiles associated with a plurality of users, wherein each user profile is indicative of an entity in which a user, of the plurality of users, has an interest;
   generating first vector representations of the first entities;
   evaluating a plurality of content events to identify a plurality of content items;
   extracting second entities from content information associated with the plurality of content items;
   generating second vector representations of the second entities;
   determining, based upon the plurality of content events, a plurality of content-associated metrics associated with the second entities, wherein:
      a first content-associated metric is representative of online activity performed in association with one or more first content items, of the plurality of content items, associated with a first entity of the second entities; and
      a second content-associated metric is representative of online activity performed in association with one or more second content items, of the plurality of content items, associated with a second entity of the second entities;
   processing, using a model, the first vector representations and the second vector representations to generate an attention distribution array, wherein each value of the attention distribution array represents, for a content item associated with an entity of the second entities, a proportion of (i) activity performed in association with the content item by one or more users having an interest in an entity of the first entities relative to (ii) an entirety of activity performed in association with the content item;

generating an inferred activity distribution array by applying the plurality of content-associated metrics to the attention distribution array;

generating a filtered subset of activity distribution values by pruning values from the inferred activity distribution array;

training a machine learning model using the filtered subset of activity distribution values to generate a trained machine learning model; and controlling transmission of content using the trained machine learning model.

19. The non-transitory machine readable medium of claim 18, wherein controlling the transmission of content comprises:

receiving a request for content associated with a client device associated with a user profile of the plurality of user profiles;

in response to receiving the request for content, determining, using the user profile and the trained machine learning model, a plurality of content item scores associated with a second plurality of content items;

selecting, based upon the plurality of content item scores, a first content item of the second plurality of content items; and providing the first content item for presentation via the client device.

20. The non-transitory machine readable medium of claim 18, wherein:

the model comprises a multi-head attention model associated with a first head and a second head;

processing the first vector representations and the second vector representations to generate the attention distribution array is performed using the first head of the multi-head attention model;

the operations comprise:

processing, using the second head of the multi-head attention model, the first vector representations and the second vector representations to generate a second attention distribution array; and generating a second inferred activity distribution array by applying the plurality of content-associated metrics to the second attention distribution array; and generating the filtered subset of activity distribution values comprises pruning values from the second inferred activity distribution array and including remaining values from the second inferred activity distribution array in the filtered subset of activity distribution values.

* * * * *